United States Patent
Hojo et al.

(10) Patent No.: US 8,211,590 B2
(45) Date of Patent: Jul. 3, 2012

(54) PROTON CONDUCTING MATERIAL, AND ELECTRODE AND FUEL CELL USING THE SAME

(75) Inventors: Nobuhiko Hojo, Osaka (JP); Taisuke Yamamoto, Nara (JP); Yukihiro Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 963 days.

(21) Appl. No.: 11/816,409

(22) PCT Filed: Mar. 14, 2006

(86) PCT No.: PCT/JP2006/305018
§ 371 (c)(1),
(2), (4) Date: Aug. 15, 2007

(87) PCT Pub. No.: WO2006/098318
PCT Pub. Date: Sep. 21, 2006

(65) Prior Publication Data
US 2009/0017356 A1    Jan. 15, 2009

(30) Foreign Application Priority Data

Mar. 15, 2005  (JP) ................................. 2005-072523
Jun. 22, 2005  (JP) ................................. 2005-181937

(51) Int. Cl.
*H01M 8/10* (2006.01)
*H01M 4/86* (2006.01)

(52) U.S. Cl. ...................................................... 429/492
(58) Field of Classification Search .................. 429/492; 521/27

See application file for complete search history.

(56) References Cited

U.S. PATENT DOCUMENTS

| | | | |
|---|---|---|---|
| 6,264,857 B1 | 7/2001 | Kreuer et al. | |
| 7,691,513 B2 * | 4/2010 | Hojo et al. | 429/492 |
| 2003/0175569 A1 * | 9/2003 | Inagaki et al. | 429/30 |
| 2004/0038105 A1 | 2/2004 | Hennige | |
| 2005/0260478 A1 * | 11/2005 | Mino et al. | 429/34 |
| 2006/0083976 A1 * | 4/2006 | Goddard et al. | 429/33 |
| 2010/0112415 A1 | 5/2010 | Hirano | |

FOREIGN PATENT DOCUMENTS

| | | |
|---|---|---|
| JP | 09 092293 | 4/1997 |
| JP | 2001-035509 | 2/2001 |
| JP | 2002-203576 | 7/2002 |
| JP | 2004 002114 | 1/2004 |
| JP | 2004-515351 | 5/2004 |
| JP | 2004 185891 | 7/2004 |
| JP | 2004-186120 | 7/2004 |
| JP | 2004 247253 | 9/2004 |

(Continued)

OTHER PUBLICATIONS

PCT International Search Report dated Jul. 4, 2006.

(Continued)

*Primary Examiner* — Gregg Cantelmo
(74) *Attorney, Agent, or Firm* — Dickinson Wright PLLC

(57) ABSTRACT

To provide a proton conducting material with which an electrode and a fuel cell capable of functioning in a stable manner even without humidification in a temperature range from room temperature to about 200° C. can be achieved. The proton conducting material includes a porous structural material having pores and a heterocyclic organic compound having proton conductivity. The organic compound contained inside the pores has a crystallite size D of 50 nm or less.

12 Claims, 5 Drawing Sheets

FOREIGN PATENT DOCUMENTS

| | | |
|---|---|---|
| JP | 2004 259593 | 9/2004 |
| JP | 2004-273298 | 9/2004 |
| JP | 2005-32531 | 2/2005 |
| JP | 2005-063755 | 3/2005 |
| WO | 02/47802 | 6/2002 |
| WO | WO 2004019439 A1 * | 3/2004 |
| WO | 2005/006352 | 1/2005 |
| WO | WO 2005101428 A1 * | 10/2005 |

OTHER PUBLICATIONS

A. Kawada, et al.; "Protonic Conductivity in Imidazole Single Crystal," The Journal of Chemical Physics, vol. 52, No. 6, Mar. 15, 1970, pp. 3121-3125.

M. Uchida, et al.; "New Preparation Method for Polymer-Electrolyte Fuel Cell," J. Electrochem, Soc., vol. 142, No. 2, Feb. 1995, pp. 463-468.

* cited by examiner

PROTON CONDUCTING MATERIAL, AND ELECTRODE AND FUEL CELL USING THE SAME

TECHNICAL FIELD

The present invention relates to a proton conducting material having at least proton conductivity, an electrode including the same and a fuel cell including the same. More particularly, the proton conducting material of the present invention has improved electrode characteristics even without humidification at a temperature from room temperature to 200° C.

BACKGROUND ART

The application development for bringing fuel cells into practical use has been promoted in recent years. The application of fuel cells include: power generation systems such as power sources for home use and distributed power generation; cogeneration systems in which the power generation system is combined with a technology to utilize waste heat; power sources for driving mobile units such as automobiles; and power sources for mobile terminal units such as electronic devices.

Among the fuel cells under development for these applications, the most promising is a solid polymer fuel cell that utilizes a solid polymer electrolyte membrane as an electrolyte membrane and is capable of operating in a temperature range from room temperature to about 80° C.

In order to bring these fuel cells into practical use, it is necessary to further reduce the size of fuel cell systems. To this end, it is effective to operate fuel cells without humidification in a temperature range from room temperature to 200° C. This is because if a fuel cell can be operated without humidification, a humidifier can be omitted in the fuel cell system. Moreover, if the operation of a fuel cell can be started from room temperature, the load applied to the heater at the start-up of the fuel cell can be reduced as compared to the fuel cell system in which the operation of a fuel cell cannot be started from room temperature. As a result, the size of the heater can be reduced or the heater itself can be omitted. Furthermore, if the operable temperature range, which is currently up to about 80° C., can be further increased, the power output generated by the fuel cell can be increased, and consequently the size of power generation unit can be reduced.

As just described, if a fuel cell capable of operating without humidification in a temperature range from room temperature to 200° C. can be achieved, further size reduction can be achieved in fuel cell systems.

The proton conducting material, which is a component of a fuel cell, in conventional techniques will be described.

Currently, the most widely used electrolyte membrane for solid polymer fuel cells is a fluorine polymer containing a strongly acidic functional group in its side chain (i.e., perfluorosulfonic acid polymer) such as NAFION (trademark) available from E.I. Du Pont de Nemours & Co. Inc. of the United States. This perfluorosulfonic acid polymer when humidified exhibits a very high proton conductivity (electrical conductive rate or proton conductive rate) of about $10^{-1}$ S/cm in a temperature range from room temperature to not greater than 100° C.

However, the perfluorosulfonic acid polymer requires humidification. And at a temperature of not less than 100° C., its conductivity decreases significantly. Therefore, the perfluorosulfonic acid polymer has a problem that it cannot be used in such a condition. This is because the perfluorosulfonic acid polymer absorbs water when humidified, whereby the water forms a path for conducting ions, but at a temperature of not less than 100° C., the water evaporates and thus the path for conducting ions disappears.

A description is now given of a specific approach for developing a proton conducting material capable of functioning in a stable manner even without humidification in a wide temperature range from room temperature to about 200° C.

In order to achieve operation without humidification, it is necessary to use a proton conducting medium except water. A candidate of the proton conducting medium is an organic compound having proton conductivity such as a heterocyclic organic compound. Specifically, imidazole, pyrazole and their derivatives are well known.

These organic compounds, however, have the following problem. Imidazole, for example, which has a melting point of 90° C., melts and turns into a liquid at a temperature equal to or greater than its melting point, and exhibits a high proton conductivity of $10^{-3}$ S/cm or greater. At a temperature lower than its melting point, however, it turns into a solid crystal, and its proton conductivity decreases by one to two digits or more (see Non-Patent Document 1, for example). In short, imidazole does function even without humidification, but it has a problem that there is a limitation in its operable temperature and its function decreases significantly at a temperature from room temperature to 90° C.

As just described, a heterocyclic organic compound such as imidazole can function as a proton conducting material without humidification, but it has the problem that its function decreases significantly at a temperature equal to or less than its melting point. This problem applies also to a proton conducting material that has a melting point and turns into a solid crystal at a temperature lower than its melting point.

In order to solve this problem, for example, the inclusion of a heterocyclic organic compound in an acidic polymer membrane is proposed (see, for example, Patent Documents 1 and 2). Specifically, there is proposed a proton conducting material obtained by including a heterocyclic organic compound, namely imidazole, in a membrane made of a polymer having an acidic group, such as polyvinyl phosphate or sulfonated polyether ketone. Also, a method for producing a proton conducting material is proposed in which a proton conductive compound (e.g., cesium hydrogen sulfate) is combined with porous silica to produce a proton conducting material (see, for example, Patent Documents 3 and 4).

Electrodes for a fuel cell will be described below.

An electrode for a fuel cell is composed mainly of three components: a catalyst, a proton conducting material and an electron conductor. A typical example is an electrode in which catalyst-carrying carbon particles and a perfluorosulfonic acid polymer serving as a proton conducting material are mixed. For designing such electrode, it is considered important to increase the contact area between the catalyst particles and the proton conductive polymer and to take into account the formation of gas channels for supplying reaction gases (see, for example, Non-Patent Document 2 and Patent Document 5).

Non-Patent Document 2 and Patent Document 5 disclose that it is important to increase the contact area between the catalyst particles and the proton conductive polymer by preventing the aggregation of the catalyst particles by controlling the ratio of the amount of the catalyst particles and that of the proton conductive polymer or the porous structure of an electrode. More specifically, the above documents disclose it is necessary to introduce a proton conductive polymer into 0.04 to 1.0 μm diameter pores of an electrode in order to prevent the aggregation of the catalyst particles and to cover the surface of the catalyst particles with the proton conductive polymer.

The electrodes disclosed in Non-Patent Document 2 and Patent Document 5 will now be described with reference to the accompanying drawing. FIG. 6 is a schematic enlarged diagram of the microstructure of a conventional electrode. In FIG. 6, catalyst particles 51 are carried on carbon particles serving as an electron conductor. A plurality of the carbon particles 52 carrying the catalyst particles 51 (hereinafter referred to as "catalyst-carrying carbon") are aggregated, forming a catalyst-carrying carbon aggregate. Proton conductive polymers 53 are arranged such that they cover the catalyst-carrying carbon aggregate. The proton conductive polymers 53 are in contact with any one of the plurality of catalyst particles 51 and the carbon particles 52.

In order to prevent the aggregation of the catalyst particles 51 to increase the contact area between the catalyst particles 51 and the proton conductive polymers 53, all the catalyst particles 51 and all the carbon particles 52 have to be covered with the proton conductive polymers 53. As clearly seen in FIG. 6, the catalyst particles 51 that are contained in the catalyst-carrying carbon aggregate are not covered with the proton conductive polymers 53. Accordingly, the catalyst particles 51 inside the aggregate are not involved in the reaction. As discussed above, the important point is to prevent the aggregation of the catalyst particles and to increase the contact area between the catalyst particles 51 and the proton conductive polymers 53, and Patent Document 5 proposes a method for designing such electrode.

Patent Document 5 points out that the structure of the electrode as described above needs to be designed differently according to the type of electrolyte (e.g., phosphoric acid or polymer electrolyte).

Patent Document 6 proposes a porous material for an ion conductor.

Non-Patent Document 1: The Journal of Chemical Physics Volume 52, Number 6, 3121-3125
Non-Patent Document 2: Journal of ElectroChemical Society Volume 142, Number 2, 463
Patent Document 1: U.S. Pat. No. 6,264,857
Patent Document 2: Japanese Laid-Open Patent Publication No. 2004-185891
Patent Document 3: Japanese Laid-Open Patent Publication No. 2004-247253
Patent Document 4: Japanese Laid-Open Patent Publication No. 2004-2114
Patent Document 5: Japanese Laid-Open Patent Publication No. Hei 9-92293
Patent Document 6: Japanese Laid-Open Patent Publication No. 2004-259593

DISCLOSURE OF THE INVENTION

Problem to be Solved by the Invention

Although the problem derived from imidazole that the proton conductivity of imidazole decreases rapidly at a temperature equal to or less than the melting point of imidazole per se is slightly alleviated in the proton conducting materials disclosed in Patent Documents 1 and 2, the proton conducting materials of Patent Documents 1 and 2 exhibit a low conductivity at low temperatures. More specifically, the proton conducting materials of Patent Document 1 and 2 exhibit a high conductivity of $10^{-3}$ S/cm at 100° C., but the conductivity decreases from $10^{-3}$ S/cm by about two digits at room temperature. This is considered to result from the difficulty in controlling the proton conduction path in a membrane obtained by mixing a heterocyclic organic compound and an acidic polymer membrane.

Cesium hydrogen sulfate (a component material of the proton conducting material disclosed in Patent Documents 3 and 4) exhibits a high proton conductivity of about $10^{-2}$ S/cm at 150° C. to 200° C. without humidification, but at a temperature less than 150° C., the proton conductivity decreases rapidly by about three digits. At a temperature of room temperature to 150° C., cesium hydrogen sulfate cannot be used. The production method disclosed in Patent Documents 3 and 4 deals with this problem and prevents the rapid decrease in proton conductivity of cesium hydrogen sulfate that occurs at a temperature of 150° C. or less. In fact, a proton conductivity of about $10^{-2}$ S/cm is obtained at 180° C., and a proton conductivity of about $10^{-4}$ S/cm is obtained at 80° C. In other words, greatly improved temperature dependence of proton conductivity is obtained as compared to conventional cesium hydrogen sulfate. However, the improved proton conducting material obtained by the above production method exhibits a proton conductivity of about $10^{-4}$ S/cm at 80° C., and this proton conductivity is expected to decrease further at room temperature. In short, the proton conducting material disclosed in Patent Documents 3 and 4 is not capable of functioning in a stable manner without humidification in a temperature range equal to or greater than room temperature.

Patent Documents 3 and 4 disclose that the production method (evaporation to dryness method) of these documents is usable where a specified silica gel (specific surface area: 200 to 1000 $m^2$/g, modal (average) pore size: 2 to 20 nm, pore volume: 0.3 to 3 ml/g) and a specified proton conductive compound (i.e., cesium hydrogen sulfate) are used together. In other words, these documents are silent on whether or not the production method and the proton conducting material obtained therefrom are applicable to a material other than cesium hydrogen sulfate. Further, if the material is changed, a problem will arise that there is a limitation in improvement of temperature characteristics.

Therefore, under the present circumstances, a proton conducting material that is practically usable and capable of functioning in a stable manner without humidification in a temperature range from room temperature to 200° C. has not been achieved yet. Accordingly, an electrode that comprises a proton conducting material, a catalyst and an electron conductor and is capable of functioning in a stable manner without humidification in a temperature range from room temperature to 200° C. has not been achieved, either.

Also, no information has been provided regarding the optimal electrode design to prevent the aggregation of catalyst-carrying carbon particles and to increase the contact area between the catalyst particles and the proton conducting material when a proton conducting material other than conventionally used phosphoric acid and polymer such as perfluorosulfonic acid polymer is used.

In order to further reduce the size of a fuel cell, it is effective to operate the fuel cell without humidification in a temperature range from room temperature to about 200° C. With the use of an electrode capable of operating under such conditions, it is possible to achieve a fuel cell system whose humidifier and heater, which have been one of the obstacles to the size reduction of a fuel cell, can be omitted, or in which the load applied to the humidifier or heater can be reduced.

In other words, it is an object of the present invention to provide a proton conducting material with which an electrode and a fuel cell that are capable of functioning in a stable manner without humidification in a temperature range from room temperature to about 200° C. can be achieved.

Means for Solving the Problem

In order to achieve the above object, the present invention provides a proton conducting material comprising: a porous structural material having pores, and a heterocyclic organic compound having proton conductivity, the heterocyclic organic compound contained in the pores, wherein a crystallite size D of the heterocyclic organic compound contained inside the pores satisfies the relational expression: D≦50 nm, where D is represented by the following equation, $$D = K \cdot \lambda / (\beta \cos \theta) \quad \text{[Equation 1]}$$

where
D: crystallite size (nm)
K: constant
λ: X-ray wavelength (nm)
β: diffraction half width (rad)

By satisfying the above relational expression, it is possible to control the size and crystal condition of the heterocyclic organic compound contained in the pores to optimal levels as well as to overcome the conventional problem encountered with a heterocyclic organic compound, that is, the decrease in proton conductivity at a temperature lower than the melting point. In other words, with the use of the proton conducting material of the present invention described above, it is possible to achieve an electrode and a fuel cell that can function in a stable manner without humidification in a temperature range from room temperature to about 200° C. In the above equation that represents D, K represents a constant, and it is usually 0.9.

As used herein, the "crystallite" refers to a first crystal, that is, the minimum unit that forms a crystal with the same orientation. The "crystallite" as used in the present invention will be described with reference to FIG. 7. FIG. 7 is a diagram schematically illustrating an optical microscope image of a crystal structure of a sample compound. In FIG. 7, the sample is formed by aggregated particles 61 and grain boundaries 62 is the interfaces between the particles 61. More specifically, each particle 61 is formed by aggregated crystallites 63. Accordingly, the "crystallite" as used in the present invention refers to the crystallite 63 that forms the particle 61, and not to the particle 61 formed by the aggregated crystallites 63. However, only when the particle 61 is formed by a single crystallite 63, and not by a plurality of crystallites 63, the crystallite equals the particle.

When the size of the crystallite 63 is several nm to ten some nm, the sample may sometimes be called a "nanocrystal". When the sire of the crystallite 63 is several nm or less and the crystallite 63 is deemed to be not crystalline, the sample may sometimes be called an "amorphous" or "non-crystalline" sample.

To describe more specifically, in the equation of D, θ represents a diffraction peak angle derived from the organic compound present inside the pores resulting from X-ray diffraction (XRD) measurement of the proton conducting material. Because every organic compound has its own stable crystal structure, the diffraction peaks, i.e. diffraction pattern, derived from the stable crystal structure can be obtained by X-ray diffractometry. Therefore, when a diffraction pattern derived from an organic compound is obtained as a result of X-ray diffractometry, the type and crystallite size of the organic compound can be estimated from the diffraction pattern.

A diffraction peak tends to be broader as the crystallite size of an organic compound decreases. Particularly when an organic compound has the extremely small crystallite size of about 10 nm or less, no distinct peak can be observed in the pattern obtained by X-ray diffractometry. In this case, if the type of the organic compound contained in the proton conducting material is determined and a distinct peak does not appear at a position corresponding to the crystallite size of 10 nm or greater of the organic compound in the diffraction pattern, the crystallite size of the organic compound can be determined to be 10 nm or less.

The type of the organic compound contained in the proton conducting material can be determined by various methods. For example, the following methods can be used: nuclear magnetic resonance (NMR) measurement, infrared spectrophotometry (IR), Raman spectroscopy and elemental analysis. Alternatively, the type of the organic compound can be determined by comprehensively analyzing the results obtained from the above listed measurement methods. These measurements may be performed by subjecting the proton conducting material itself thereto, or by subjecting the organic compound extracted from the proton conducting material. The organic compound can be extracted from the proton conducting material by, for example, heat vaporization or solvent extraction in which a material to be extracted is immersed in a solvent in which the organic compound is soluble.

Effect of the Invention

Because the proton conducting material of the present invention has at least proton conductivity and can also have electron conductivity, it can offer an electrode capable of providing excellent characteristics in a stable manner without humidification in a temperature range from room temperature to 200° C. In a fuel cell system including this electrode, the provision of a humidifier and a heater can be omitted or the sizes of the humidifier and the heater can be reduced. As a result, a compact fuel cell system can be achieved. Moreover, the operable temperature, which currently ranges from about 70 to 80° C., can be increased to 100° C. or greater. Accordingly, a fuel cell of higher output power can be achieved.

The application of the proton conducting material of the present invention is applicable not only to fuel cells, but also to various devices that utilize an ion conductor such as primary batteries, secondary batteries, condensers, sensors, capacitors, electrochromic devices and electrolytic cells, and can improve the characteristics of the devices.

BEST MODE FOR CARRYING OUT THE INVENTION

The present invention provides a proton conducting material comprising: a porous structural material having pores, and a heterocyclic organic compound having proton conductivity (hereinafter sometimes referred to simply as "organic compound"), the organic compound contained in the pores, wherein a crystallite size D of the organic compound contained inside the pores satisfies the relational expression: $D \leq 50$ nm, where D is represented by the following equation, $$D = K \cdot \lambda / (\beta \cos \theta) \quad \text{[Equation 2]}$$

where
D: crystallite size (nm)
K: constant
$\lambda$: X-ray wavelength (nm)
$\beta$: diffraction half width (rad)

The lower limit of the crystallite size D of the organic compound, which will be described later in detail, is preferably the same size as or larger than the molecule of the organic compound.

The porous structural material preferably has a pore size of not less than 0.5 nm and not greater than 50 nm so as to further ensure that the organic compound is retained in the proton conducting material while satisfying the above relational equation.

The heterocyclic organic compound is preferably an imidazole derivative.

The heterocyclic organic compound per se preferably has a melting point not less than a working temperature of the proton conducting material and not greater than 360° C.

The porous structural material preferably comprises at least one of a metal oxide, glass, ceramics and a resin, or at least one of a carbon structural material and a metal.

Also, it is preferred that an acidic functional group or basic functional group is immobilized on a surface of the pores of the porous structural material by covalent bonding.

Preferably, the amount of the acidic functional group or basic functional group immobilized on a surface of the pores of the porous structural material is 0.01 to 0.5 molar ratio relative to the amount of the proton conductive heterocyclic organic compound contained inside the porous structural material.

The acidic functional group is preferably at least one selected from the group consisting of a hydroxy group, a carboxyl group, a phosphonic acid group and a sulfonic acid group.

The covalent bonding is preferably formed by a coupling reaction.

The present invention also relates to an electrolyte membrane and an electrode that comprise the above proton conducting material.

The electrode may further include a catalyst. In this case, the catalyst is preferably carried on a surface of the proton conducting material.

The present invention also relates to a fuel cell comprising the above electrolyte membrane and a fuel cell comprising the above electrode.

Embodiment 1

Figure 1:
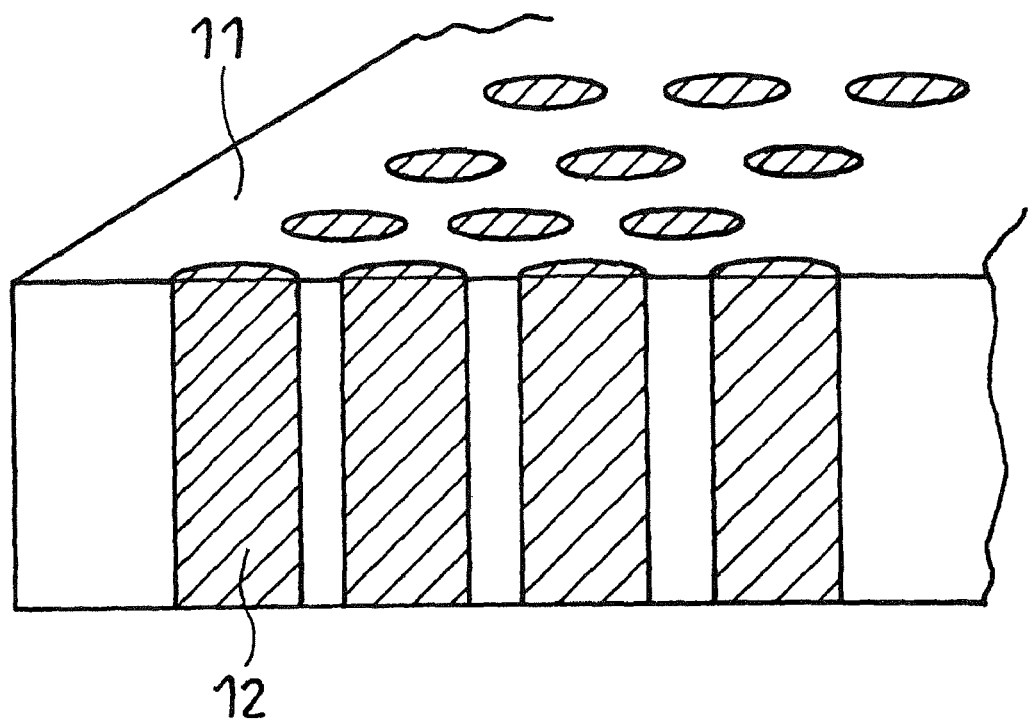
FIG. 1 is a schematic cross sectional view of a proton conducting material in the form of a film according to Embodiment 1 of the present invention.

FIG. 1 is a schematic cross sectional view of a proton conducting material in the form of a film according to an embodiment of the present invention. In FIG. 1, in a porous structural material 11 in the form of a film having pores (through holes), a heterocyclic organic compound 12 having proton conductivity is contained inside the pores. The proton conductive heterocyclic organic compound 12 contained in the pores of the porous structural material 11 has a crystallite size of not less than 0.5 nm and not greater than nm.

According to this constitution, it is possible to obtain a proton conducting material in which a proton conductive heterocyclic organic compound is contained in the pores of a porous structural material. With this proton conducting material, it is possible to overcome the conventional problem encountered with a heterocyclic organic compound, that is, the decrease in electric conductivity at a temperature equal to or less than the melting point. Further, the proton conducting material can exhibit excellent proton conductivity in a wide temperature range from room temperature to 200° C. even without humidification. Particularly when a porous structural material having electron conductivity is used, the obtained proton conducting material also possesses electron conductivity and thus exhibits excellent electron conductivity as well as excellent proton conductivity in a wide temperature range from room temperature to 200° C. even without humidification.

The present inventors conducted extensive study on the decrease in proton conductivity at a temperature lower than the melting point which has been the problem encountered with a proton conductive heterocyclic organic compound. As a result, they found that the crystallite size of the heterocyclic organic compound has a correlation with proton conductivity. When the heterocyclic organic compound has a large crystallite size at a temperature equal to or less than the melting point, in other words, when crystallization is proceeding, a decrease can be observed in proton conductivity at a temperature equal to or less than the melting point. Conversely, when the heterocyclic organic compound has a small crystallite size at a temperature equal to or less than the melting point, in other words, when crystallization does not proceed so much, the degradation of proton conductivity cannot be observed at a temperature equal to or less than the melting point. As a result, the present inventors found that the crystallite size of the heterocyclic organic compound itself contained in the proton conducting material at a temperature equal to or less than the melting point satisfies the above relational expression, more specifically, they found that the crystallite size is not less than 0.5 nm and not greater than 50 nm.

As described previously, the "crystallite" as used in this invention refers to a first crystal, that is, the minimum unit that forms a crystal with the same orientation. Although the "crystallite size" can be determined by an electron microscope, it is effective to employ X-ray diffractometry to determine the crystallite size because X-ray diffractometry is capable of measuring in a nondestructive manner in a short time, and enables more precise estimation of the crystallite size, i.e. the size of first crystal, which is important in the present invention.

In X-ray diffractometry, the crystallite size D can be calculated from the Scherer equation given below using the half width of a diffraction peak of the heterocyclic organic compound.

$$D = K \cdot \lambda / (\beta \cos \theta) \quad \text{[Equation 3]}$$

where
D: crystallite size (nm)
K: constant
$\lambda$: X-ray wavelength (nm)
$\beta$: diffraction half width (rad)

When the crystallite size is large, a sharp peak can be observed in the X-ray diffraction. Conversely, when the crystallite is small, the half width of the obtained diffraction lines increases, and so-called "line broading" occurs. From this half width of the diffraction lines, the crystallite size can be estimated. When the crystallite is extremely small, diffraction lines do not appear and a halo pattern appears instead. This condition is called "X-ray diffractometrically amorphous".

The present inventors further found that, in order to make the heterocyclic organic compound to have a crystallite size within the above range, it is effective to use a porous structural material having pores with a pore size of not less than 0.5 nm and not greater than 50 nm to produce a proton conducting material of the present invention. When a porous structural material having the above pore size is used, the heterocyclic organic compound contained inside the pores will be largely affected by the interaction of the interface between the heterocyclic organic compound and the inner surface of the pores of the porous structural material. For this reason, the effect of inhibiting the crystallization of the heterocyclic organic compound can be exhibited.

As described above, the proton conducting material of the present invention prevents the heterocyclic organic compound from crystallizing into large crystals at a temperature equal to or less than the melting point. Instead, the heterocyclic organic compound becomes microcrystalline or amorphous, and prevents the degradation of proton conductivity.

The porous structural material 11 of the present invention may be or may not be electron conductive as long as the porous structural material has pores with a size of not less than 0.5 nm and not greater than 50 nm.

Examples of the non-electron conductive structural material include: inorganic materials such as metal oxide, glass and ceramics; organic materials such as resin; and the mixtures thereof. More specifically, an inorganic material such as alumina, silica or titania, or an organic material such as polyolefin resin, fluorine resin, aramid resin, silicone resin, amide resin, imide resin or melanin resin can be used.

Preferred is alumina, silica or titania because they are excellent in heat resistance and stability of pore structure and a porous structural material having a controlled pore size can be obtained by a simple method. The porous structural material having a controlled pore size is preferably mesoporous silica, silica or titania nanotube.

As the electron conductive porous structural material, a carbon structural material, metal or conductive polymer can be used, for example. Among them, particularly preferred is a carbon structural material, a metal, or a mixture of a carbon structural material and a metal because they are excellent in conductivity and a porous structural material having a controlled pore size can be obtained in an easy manner.

As the method for producing an electron conductive porous structural material, specifically, there are the following methods: (i) the method in which a porous resin such as polyimide or polyacrylonitrile is baked; and (ii) the method in which a carbon source such as furfuryl alcohol or sucrose is introduced into the pores of porous silica or alumina serving as a mold, which is then baked to form carbon, after which the silica or alumina is melted. It is also possible to use a tube-shaped carbon porous structural material such as carbon nanotube or carbon nanohorn.

Even when a porous structural material without electron conductivity is used, electron conductivity can be imparted by covering the surface of the porous structural material with an electron conductive material such as a carbon structural material, metal or conductive polymer. As the porous structural material without electron conductivity, the materials listed above can be used.

The pore size of the porous structural material 11 can be measured by, for example, a method such as gas adsorption measurement, mercury intrusion porosimetry or bubble point porosimetry. Among them, preferred is gas adsorption porosimetry because it is simple and convenient.

Although a porous structural material 11 in the form of a film is shown in FIG. 1, the porous structural material can be, for example, spherical or particulate.

Figure 2:
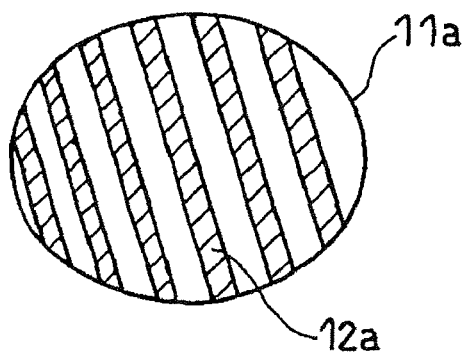
FIG. 2 is a schematic cross sectional view of a proton conducting material in the form of a sphere or particle according to a variant of Embodiment 1 of the present invention.

FIG. 2 shows a schematic cross sectional view of a proton conducting material in the form of a sphere or particle according to a variant of the present invention. The proton conducting material shown in FIG. 2 comprises a spherical or particulate porous structural material 11a and the above-described heterocyclic organic compound 12a filled into the pores of the porous structural material 11a.

Additionally, a fibrous proton conducting material can be obtained by using a fibrous porous structural material. Alternatively, a proton conducting material of the present invention in the form of a formed film can be obtained by pressing a mixture of a spherical or particulate proton conducting material and a binder.

As the proton conductive heterocyclic organic compound usable in the present invention, the following organic compounds can be used. Examples include imidazole, oxazole, pyrrone, pyrimidine, quinoline, piperidine, morpholine, furan, uracil, thymine, cytosine and derivatives thereof. Among them, preferably used are imidazole and its derivatives because they have a high proton conductivity, heat resistance and potential resistance.

Examples of imidazole derivatives include benzimidazole, pyrazole, purine, adenine, guanine, 2-phenyl imidazole, 2-methylimidazole, 2-ethylimidazole, 2-isopropylimidazole, methyl-4-imidazole carboxylate, imidazole hydrochloride, imidazole trifluoromethanesulfonate, imidazole bistrifluoromethyl sulfonyl imide, 4-methyl,5-imidazolecarboxyaldehyde, 4,5-dicyanoimidazole, 4-imidazolecarboxyaldehyde, 2-methylbenzimidazole, 4,5-dichlorobenzimidazole, 5,6-dimethylbenzimidazole, imidazole-2-carboxyaldehyde, 4-bromoimidazole, 4-imidazole acrylic acid, 2-aminobenzimidazole, 2-methyl-5-nitroimidazole, 2-aminopurine, 2-nitroimidazole and 4-imidazole carboxylic acid.

The proton conductive heterocyclic organic compound per se preferably has a melting point not less than the working temperature of the proton conducting material and not greater than 360° C.

When the melting point is not greater than the working temperature of the proton conducting material, the heterocyclic organic compound turns into a liquid or gas and becomes fluid. As a result, it may flow from the porous structural material to the outside. Conversely, when the melting point is not less than 360° C., it may become difficult to fill the heterocyclic organic compound into the porous structural material.

A molten salt obtained by cationizing a heterocyclic organic compound (typically, 1-methyl,4-ethylimidazolium, trifluoromethane sulfonate) and neutralizing it with an acid anion has a melting point of around room temperature or lower than room temperature, and therefore it is excluded from the heterocyclic organic compound of the present invention.

As used herein, the "working temperature" of the proton conducting material refers to a temperature at which a fuel cell is used in a steady state condition, and not to a temporary low or high temperature condition at which thermal equilibrium is not reached. For example, when a fuel cell containing the proton conducting material is operated in a steady state condition at 60° C., the working temperature of the proton conducting material is 60° C.

The essence of the proton conducting material of the present invention is to overcome the problem inherent in a compound, which is normally crystallized at a temperature equal to or not less than the melting point, causing a rapid decrease in proton conductivity, by containing the compound into the pores of a porous structural material having a pore size of not less than 0.5 nm and not greater than 50 nm. Accordingly, as the proton conductive heterocyclic organic compound usable in the present invention, although those listed above are preferable, a similar effect can be equally obtained by using a compound other than those listed above as long as the compound per se has a melting point and its proton conductivity rapidly decreases at a temperature equal to or less than the melting point.

The proton conducting material in the form of a film according to this embodiment can be used as an electrolyte membrane for fuel cells, an electrolyte for secondary batteries or capacitors, or the like. The spherical or particulate proton conducting material is applicable to an electrode for fuel cells, secondary batteries or capacitors, or the like by mixing it with an electron conductive material such as carbon, or by mixing it with an active material or a catalyst and a binder.

Embodiment 2

The proton conducting material according to this embodiment is a proton conducting material in which an acidic functional group or basic functional group is immobilized on a surface of the pores of a porous structural material by covalent bonding. By introducing an acidic functional group or basic functional group to a surface of the pores of a porous structural material, the proton conductivity of the heterocyclic organic compound can be retained without rapidly decreasing it even at a temperature equal to or less than the melting point of the organic compound per se.

As the porous structural material according to this embodiment, those listed in Embodiment 1 can be used. The form thereof is not limited. As the porous structural material without electron conductivity, an inorganic material such as alumina, silica or titania is preferably used. As the electron conductive porous structural material, a carbon structural material is preferably used. This is because, unlike the case where the porous structural material is made of resin, an acidic functional group or basic functional group can be introduced while retaining the pore structure. Moreover, the introduction of an acidic or basic functional group enables the control design of proton conduction path. In addition, an acidic or basic functional group can be disposed intensively inside the pores of the porous structural material that will form a proton conduction path, and this appears to contribute the retention and improvement of proton conductivity.

For the introduction of the functional group to the surface of the porous structural material, a coupling reaction such as a silane coupling reaction can be used. Using a coupling agent having an acidic or basic functional group, the functional group can be immobilized directly on the surface of the inorganic material by a coupling reaction. Alternatively, two stage reaction may be performed in which organic molecules are immobilized directly on the surface of the inorganic material by a coupling reaction so as to cause a chemical reaction with the organic molecules, after which an acidic or basic functional group is introduced.

An example of the coupling agent usable in the present invention is shown below.

As the silane coupling agent, there can be used a compound having a $SiX_nY_m$ group in its molecule (where X is at least one selected from halogen and an alkoxy group having a carbon number of 8 or less; Y is at least one selected from an aromatic substituent including at least one hydrocarbon group having a carbon number of 8 or less, a hydrogen atom, a hydrocarbon group having a carbon number of 8 or less and a phenyl group; and n and m are 0 or positive integers which satisfy n+m=3).

Although the foregoing described using a silane coupling agent whose bonding group is a silane group as an example of the coupling agent, other than the silane coupling agent, there can be used a Ti coupling agent, Ge coupling agent, Sn coupling agent, Zr coupling agent or Hf coupling agent. For example, a porous structural material is immersed in a solution prepared by dissolving one of these coupling agents in a solvent, whereby the coupling agent is reacted with active hydrogen of the inner surface of the pores of the porous structural material to form a siloxane bond in the case where the bonding group is a silane group. Thereby, the organic molecules can be immobilized on the inner surface of the pores of the porous structural material.

The "acid" and "base" used in this specification means an acid and base defined by Brönsted theory. Specifically, a material that releases a proton is an acid, and a material that accepts a proton is a base. In other words, of two different materials having different acidities (pKa), the one having a higher acidity is an acid, and the other one having a lower acidity is a base.

When imidazole is used as the proton conductive organic compound and a sulfonic acid group is used as the functional group to be immobilized on the surface of the pores of the porous structural material, the sulfonic acid, which has a higher acidity, acts as an acid and the imidazole acts as a base. Protons migrate from the sulfonic acid to the imidazole, which increases the concentration of mobile protons in the imidazole serving as a proton conduction part. Thereby, proton conductivity is improved.

Because imidazole and pyrazole, which are preferably used as the proton conductive heterocyclic organic compound in the present invention, are organic compounds which are relatively easy to function as a base, as the functional group to be introduced to the surface of the porous structural material, it is preferred to use an acidic functional group capable of donating a proton to the proton conductive heterocyclic organic compound.

Examples of the acidic functional group to be immobilized on the surface of the porous structural material include phosphonyl group (—HPO), phosphinyl group (—H$_2$PO), sulfonyl group (—SO$_2$—), sulfinyl group (—SO—), carboxyl group (—COOH), phosphonic acid group (—PO(OH)$_2$), phosphinic acid group (—HPO(OH)), sulfonic acid group (—SO$_3$H), sulfinic acid group (—SO$_2$H), mercapto group (—SH), hydroxyl group (—OH) and phosphoric acid group (—PO$_4$). Among them, functional groups such as hydroxyl group, carboxyl group, phosphonic acid group or sulfonic acid group, which have a high acidity, are preferred.

Examples of the basic functional group to be immobilized on the surface of the porous structural material include ether bond group (—O—), nitro group (—NO$_2$), quaternary ammonium group (—NH$^{4+}$), amino group (—NH$_2$), and nitrogen-containing heterocyclic group such as imidazole group, benzimidazole group, oxazole group and indole group. Among them, organic molecules having a quaternary ammonium group, amino group or nitrogen-containing heterocyclic group are preferred.

It is effective that the acidic or basic functional group is introduced in an amount of 0.01 to 0.5 at a molar ratio relative to that of the organic compound contained in the porous structural material so as to improve proton conductivity.

Similarly to the proton conducting material according to Embodiment 1, the proton conducting material of this embodiment can be used as an electrolyte or electrode for fuel cells, secondary batteries, capacitors or the like.

Embodiment 3

An electrode containing the particulate proton conducting material of the present invention that was described in Embodiment 1 with reference to FIG. 2 will be described here as Embodiment 3. In this embodiment also, an acidic or basic functional group may be immobilized on the surface of the pores of the porous structural material by covalent bonding as described in Embodiment 2.

Figure 3:
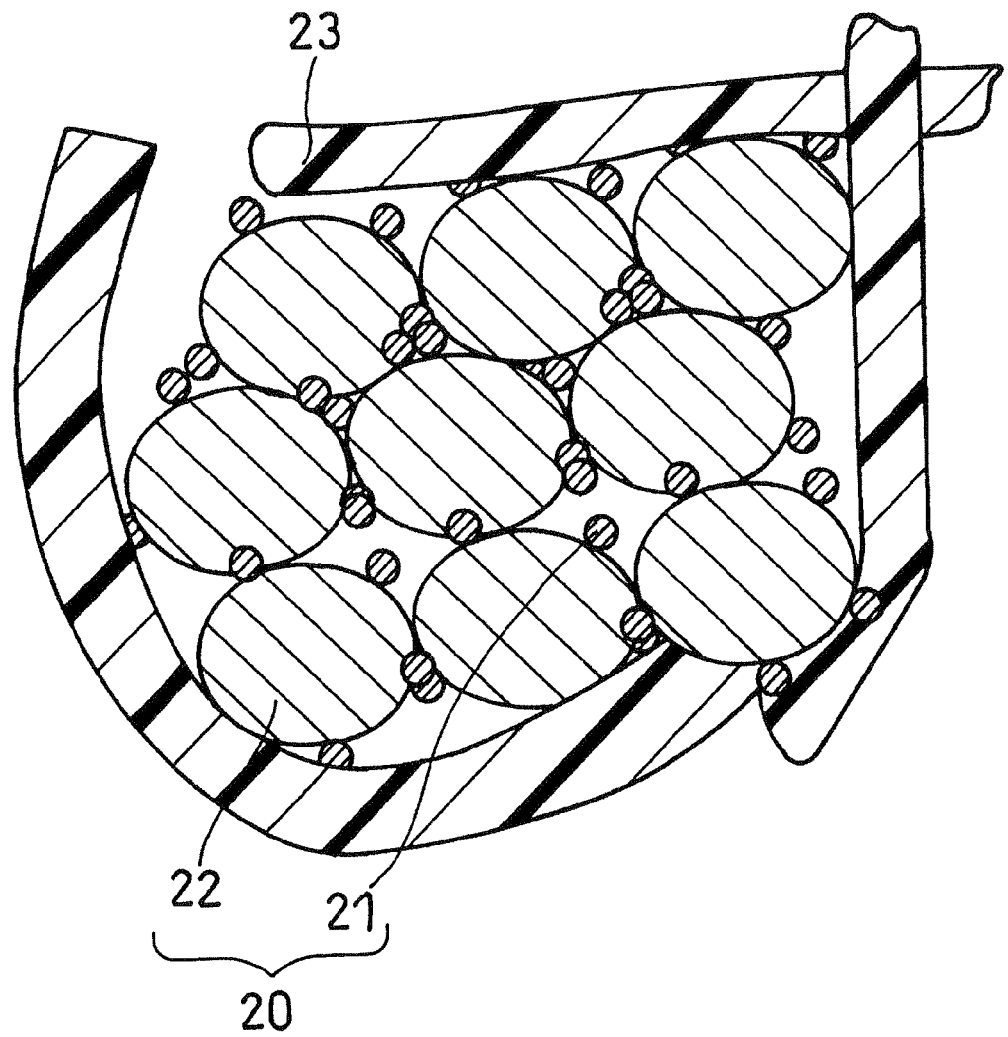
FIG. 3 is a diagram schematically illustrating the microstructure of a relevant part of an electrode according to Embodiment 3.

FIG. 3 is a diagram schematically illustrating the microstructure of a relevant part of an electrode according to this embodiment. As shown in FIG. 3, in the electrode of this embodiment, catalyst particles 21 are carried on proton conducting material particles 22 having electron conductivity and proton conductivity. A plurality of the proton conducting material particles 22 having the catalyst particles 21 carried thereon aggregate to form a catalyst-carrying proton conducting material aggregate 20. Proton conductive polymers 23 are disposed such that they cover the catalyst-carrying proton conducting material aggregate 20. The proton conductive polymers 23 are in contact with either of the plurality of catalyst particles 21 and the proton conducting material particles 22.

In FIG. 3, although the outer surface of the catalyst-carrying proton conducting material aggregate 20 is in contact with the proton conductive polymers 23, the catalyst particles 21 inside the aggregate 20 are not in contact with the proton conductive polymers 23. In the case where the catalyst carrier is an electron conductor such as carbon as in a conventional technique, the catalyst particles inside the aggregate are not utilized. However, in the electrode according to this embodiment, the catalyst particles inside the aggregate 20 are utilized. This is because a proton conducting material having electron conductivity and proton conductivity is used as a catalyst carrier, which provides sufficient proton conduction paths between the catalyst particles 21 and the proton conducting material particles 22 serving as a catalyst carrier.

As described above, by including the proton conducting material of this embodiment in an electrode, it is possible to easily obtain an electrode having an enhanced catalyst utilization rate, which has been considered difficult.

According to conventional techniques, in order to obtain an electrode in which proton conduction paths are ensured between a catalyst particle and a proton conducting material by mixing materials having different physical properties and different sizes, e.g. a catalyst-carrying particle and a proton conducting material, without allowing them to aggregate, a highly advanced dispersion/mixing technique is required. In contrast, according to the present invention, an excellent electrode can be obtained in an easy manner. Further, in conventional techniques, the optimization of electrode constitution is required every time a different material is used for the proton conducting material. According to the present invention, however, it is possible to obtain an excellent electrode in an easy manner regardless of the material used for the proton conducting material.

Further, even if proton conduction paths were ensured between a catalyst and a proton conducting material inside an electrode according to a conventional technique, the electrode would suffer various problems such as a decrease in contact area between the catalyst and the proton conducting material, a decrease of proton conduction paths and a decrease in catalyst utilization rate, which can lead to a degradation of the electrode during power generation. In contrast, in the electrode of the present invention, the contact area between the catalyst and the proton conducting material can be ensured in an easy manner, and therefore the effect of suppressing the degradation of electrode during power generation can be expected.

In this embodiment, an example is shown in which a catalyst is carried on the proton conducting material of Embodiment 1 or 2. To bring catalyst particles into contact with the electron conductor and the proton conducting material, this constitution is preferable. However, it should be understood that the present invention is not limited to this constitution. In other words, a catalyst may or may not be carried on the electron conductor.

When a catalyst is carried on the proton conducting material of the present invention, for example, (i) a heterocyclic organic compound is filled into the pores of the electron conductive porous structural material to form a electron conducting and proton conducting material, after which a catalyst is carried on the surface of the electron conducting and proton conducting material. Alternatively, (ii) after a catalyst is carried on the porous structural material, a heterocyclic organic compound is filled into the pores of the porous structural material. In the case of (ii), however, some of the catalyst will be enclosed inside the porous structural material, which creates catalyst unable to be used. Accordingly, in this case, it is preferable to prevent the catalyst from being carried in the pores of the porous structural material. Specifically, it is preferred to fill the pores of the porous structural material with a resin so as to prevent the catalyst from entering the pores, after which a catalyst is carried, the resin in the pores is removed, and a heterocyclic organic compound is filled into the pores.

In Embodiment 3, an example is shown in which a proton conductive polymer is included in an electrode. However, it should be understood that the present invention is not limited to this constitution. The electrode of the present invention can be obtained without using a proton conductive polymer.

The proton conductive polymer preferably has a cation exchange group such as a sulfonic acid group, carboxylic acid group, phosphonic acid group or sulfonimide group. In terms of proton conductivity, particularly preferred are those having a sulfonic acid group. As the polymer electrolyte having a sulfonic acid group, a copolymer containing a polymer unit based on a perfluorovinyl compound represented by $CF_2=CF-(OCF_2CFX)_m-O_p-(CF_2)_n-SO_3H$ (where m is an integer from 0 to 3, n is an integer from 1 to 12, p is 0 or 1, and X represents a fluorine atom or a trifluoromethyl group) and a polymer unit based on tetrafluoroethylene is preferred.

Preferred examples of the fluorovinyl compound include $CF_2=CFO(CF_2)_q-SO_3H$, $CF_2=CFOCF_2CF(CF_3)O(CF_2)_r-SO_3H$ and $CF_2=CF(OCF_2CF(CF_3))_tO(CF_2)_2-SO_3H$. In the formulas, q is an integer from 1 to 8, r is an integer from 1 to 8, and t is an integer from 1 to 3.

Specific examples of the polymer electrolyte include NAFION (trade name) manufactured by E.I. Du Pont de Nemours & Co. Inc., USA and Flemion (trade name) manufactured by Asahi Glass Co, Ltd.

In the electrode of the present invention, as the materials for the components other than the proton conducting material of the present invention, commonly used materials can be used. Examples of the catalyst include: noble metals such as platinum, ruthenium, palladium, rhodium, iridium and osmium; alloy catalysts containing the noble metal; and alloy catalysts containing the noble metal and a transition metal such as nickel, cobalt or iron.

In addition to the proton conducting material of the present invention and the catalyst, an additional electron conductor, an additional proton conducting material and a binder may be further contained in the electrode of the present invention. The electron conductor can be a conventional one such as carbon, metal or conductive polymer. As the proton conducting material, there can be used a proton conductive polymer, metal oxide such as heteropoly acid, tungstic acid, solid acid such as cesium hydrogen sulfate, phosphoric acid, ionic liquid, or proton conductive heterocyclic organic compound. As a binder, there can be used a polymer resin binder such as polytetrafluoroethylene, polyvinylidene fluoride, polyacrylic acid or methylcellulose.

When producing the electrode according to this embodiment, a catalyst paste is first prepared by mixing a catalyst, the proton conducting material of the present invention, and optionally an additional electron conductor, an additional proton conducting material and a binder and dispersing the mixture in a solvent. The obtained catalyst paste is applied onto a substrate, followed by drying to form a catalyst layer on the substrate. The catalyst layer is then removed from the substrate. The removed catalyst layer can be used as an electrode. Alternatively, the catalyst paste prepared above can be applied directly onto an electrolyte membrane to produce an electrode comprising a catalyst layer and an electrolyte membrane. For the application of the catalyst paste, various methods such as spray application or printing can be used.

Because the electrode of this embodiment includes the above-described proton conducting material of the present invention, it can function in a wide temperature range from room temperature to about 200° C. without humidification and provide a high output power.

Embodiment 4

Figure 4:
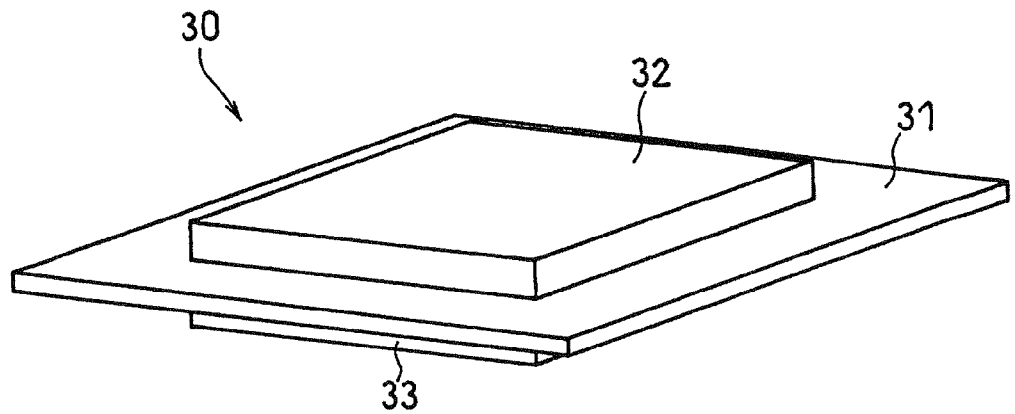
FIG. 4 is a schematic oblique view showing the structure of a membrane electrode assembly which is a relevant part of a fuel cell according to Embodiment 4.

A fuel cell containing the proton conducting material of the present invention will be described here as Embodiment 3. FIG. 4 is a schematic oblique view of a membrane electrode assembly which is the relevant part of a fuel cell of this embodiment.

As shown in FIG. 4, a membrane electrode assembly 30 comprises an electrolyte membrane 31, an anode 32 and a cathode 33 which sandwich the electrolyte membrane 31. In this embodiment, the electrolyte membrane 31 is made of the proton conducting material of the present invention. Because the membrane electrode assembly 30 includes the electrolyte membrane 31 made of the proton conducting material of the present invention described above, it can operate in a temperature range from room temperature to 200° C. without humidification.

The proton conducting material of the present invention may be included in at least one of the anode 32 and the cathode 33. An electrode for fuel cells (anode and cathode) contains an electron conductive material, a catalyst and a proton conducting material. Accordingly, at least either the anode or cathode can be produced by, for example, by mixing Pt serving as a catalyst, a carbon powder serving as an electron conductive material and the proton conducting material of the present invention serving as a proton conducting material, and molding the mixture. The electrolyte membrane 21, the anode 22 and the cathode 33 may be clamped by a press.

In the membrane electrode assembly 30 shown in FIG. 4, the electrolyte membrane 31, the anode 32 and the cathode have an approximately rectangular shape. When observed from the normal line direction of the membrane electrode assembly 30, the anode 32 and the cathode 33 have approximately equal area. The electrolyte membrane 31 has an area larger than those of the anode 32 and the cathode 33. The entire perimeter of the electrolyte membrane 31 is located outside the perimeters of the anode 32 and the cathode 33.

Figure 5:
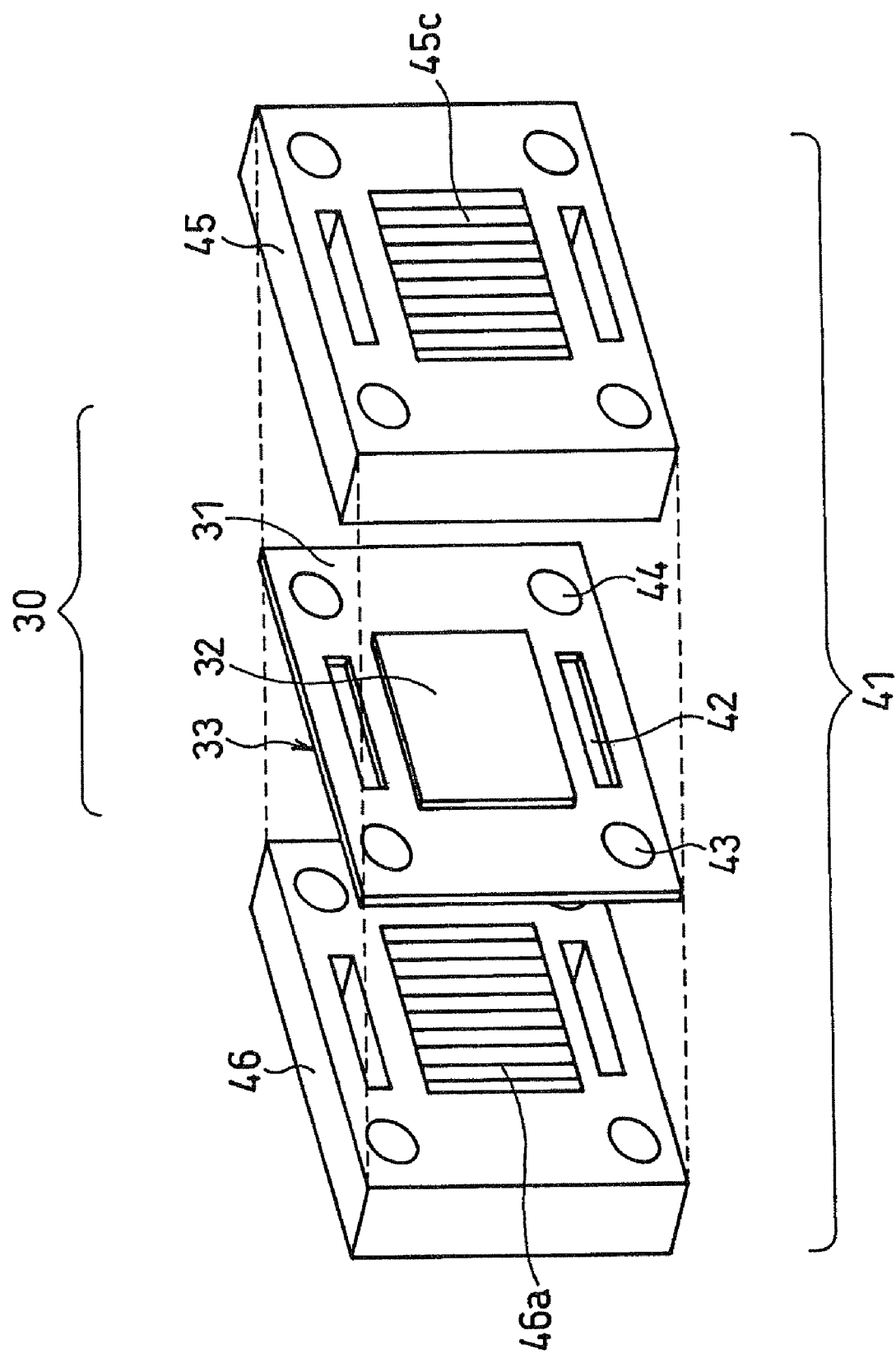
FIG. 5 is a schematic exploded oblique view illustrating the structure of a fuel cell according to Embodiment 4.
Figure 6:
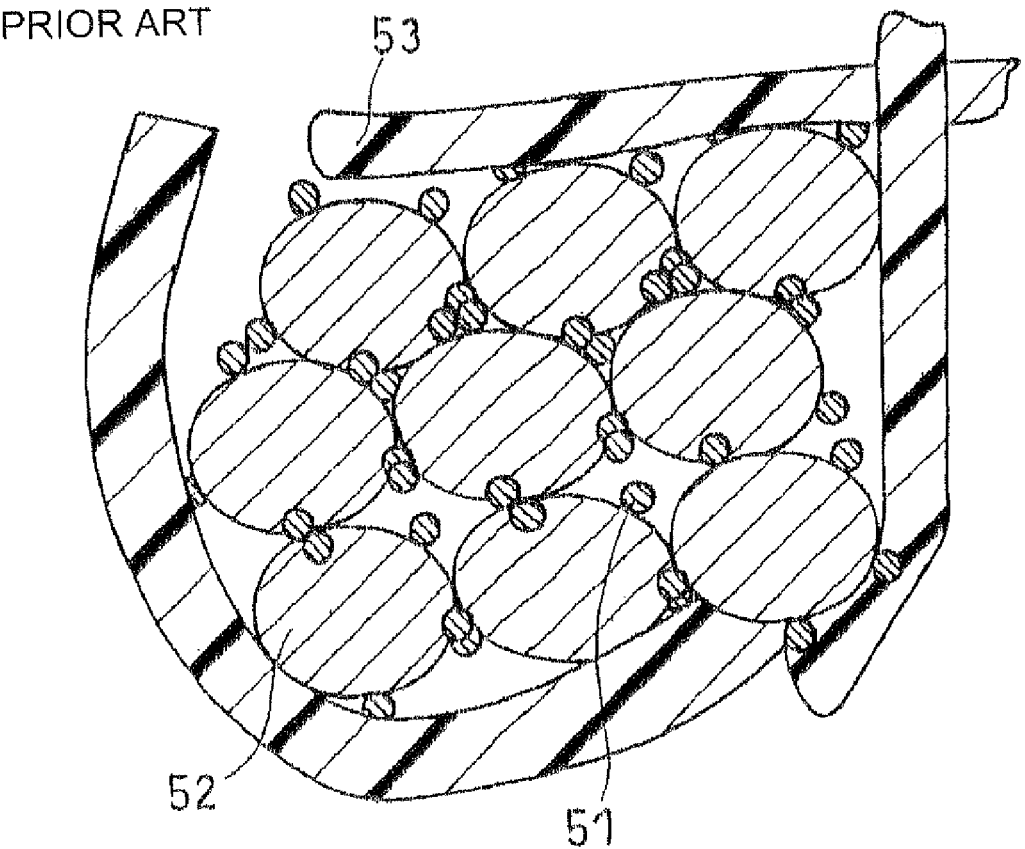
FIG. 6 is a diagram schematically illustrating the microstructure of a relevant part of a conventional electrode.
Figure 7:
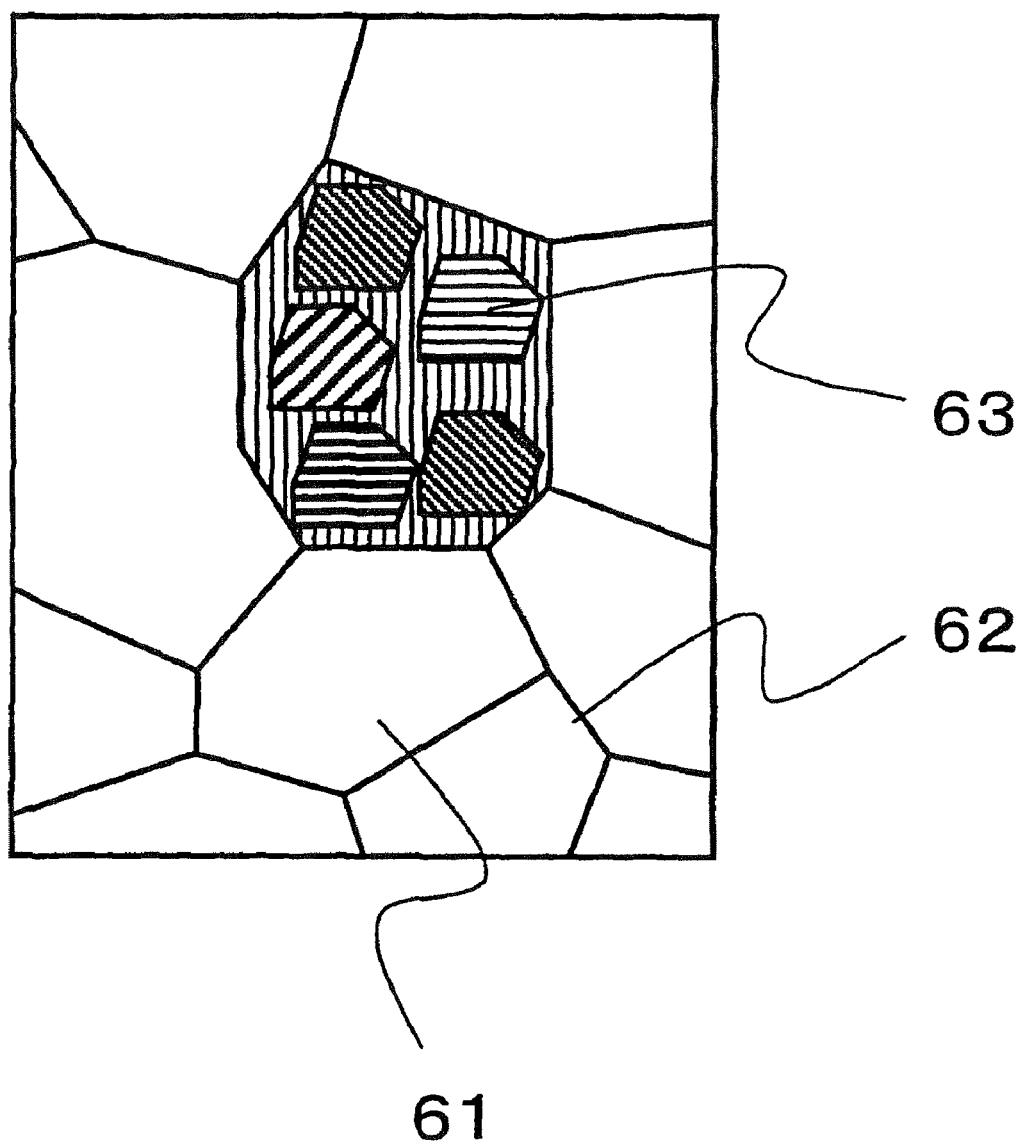
FIG. 7 is a diagram schematically illustrating an optical microscope image of a crystal structure of a certain compound.

FIG. 5 is a schematic exploded oblique view illustrating a structure of the fuel cell of this embodiment. As shown in FIG. 5, a fuel cell 41 of this embodiment includes the membrane electrode assembly 30 described above (i.e., a stack of the electrolyte membrane 31 containing the proton conducting material of the present invention, the cathode 32 and the anode 33), an anode-side separator 45 and a cathode-side separator 46 which sandwich the membrane electrode assembly 30.

The fuel cell according to this embodiment can have a conventionally known structure and can be produced by a conventionally known method except that the proton conducting material of the present invention is included in at least one of the electrolyte membrane 31, the anode 32 and the cathode 33. As such, the fuel cell of this embodiment will be discussed only briefly and a detailed description thereof will be omitted.

On a surface of the cathode-side separator 46 facing the membrane electrolyte assembly 30 is formed an oxidant flow channel 46a for supplying an oxidant to the cathode 33. This oxidant flow channel 46a comprises a plurality of parallel grooves. However, the present invention is not limited thereto. On the other surface is formed a coolant flow channel (not shown) for supplying a coolant. This coolant flow channel also comprises a plurality of parallel grooves (not shown). However, the present invention is not limited thereto.

On a surface of the anode-side separator 45 facing the membrane electrolyte assembly 30 is formed a fuel flow channel (not shown) for supplying a fuel to the anode 32. This fuel flow channel also comprises a plurality of parallel grooves (not shown). However, the present invention is not limited thereto. On the other surface is formed a coolant flow channel 45c for supplying a coolant. This coolant flow channel 45c also comprises a plurality of parallel grooves. However, the present invention is not limited thereto.

In the edge portion of the electrolyte membrane 31 included in the membrane electrode assembly 30 are formed a fuel supply manifold 43, an oxidant supply manifold 44 and a coolant supply manifold 42. When the fuel cell is an air-cooling type, the coolant supply manifold 42 need not necessarily be formed. The fuel supply manifold 43 and the oxidant supply manifold 44 are not necessarily formed in the membrane electrode assembly 30.

Although not shown, the fuel supply manifold 43, the oxidant supply manifold 44 and the coolant supply manifold 42 communicate with the fuel flow channel, the oxidant flow channel 46a and the coolant flow channel, respectively.

Because the fuel cell of this embodiment includes an electrolyte membrane containing the proton conducting material of the present invention described above, it can operate in a temperature range from room temperature to 200° C. without humidification and provide a high output power.

The materials for the components other than the electrolyte membrane and the electrodes as well as the structures thereof are not specifically limited, and commonly used components for conventional solid polymer electrolyte fuel cells can be used. As for the fuel, those used in conventional solid polymer electrolyte fuel cells can be used such as a fuel containing at least one of gaseous or liquid hydrogen and gaseous or liquid hydrocarbon. Specific examples include: alcohols such as methanol, ethanol and ethylene glycol; ethers such as dimethylether, dimethoxyethane, trimethoxymethane and trioxane; and aqueous solutions thereof. When the fuel is in a liquid form, the fuel may be supplied to the fuel cell from a cartridge or the like.

EXAMPLES

The present invention will be described below in further detail with reference to examples. It should be understood, however, that the present invention is not limited to the examples given below.

In Examples 1 to 7, proton conducting materials of the present invention were produced by using porous glass in the form of a film having through holes in the thickness direction and different pore sizes as a porous structural material, and imidazole as a proton conductive heterocyclic organic compound.

Example 1

In Example 1, as a porous structural material, porous glass (average pore size: 2 nm, porosity: 25%, thickness: 0.5 mm) was used.

A proton conducting material was produced as follows. Imidazole in an amount of 10 g placed in a beaker was heated and melted, to which the vacuum-dried porous glass was added, followed by vacuum impregnation to introduce the imidazole into the pores of the porous glass. After the impregnation, the porous glass was removed from the beaker, which was then cooled at room temperature. The crystals of imidazole deposited on the surface were wiped off with a wiping rag dampened with ethanol. Thereby, a sample 1 was obtained. Gas adsorption porosimetry conducted before and after imidazole was filled confirmed that all the pores were filled with imidazole.

To remove the acid on the surface of the porous glass, in other words, to exclude the influence of the hydroxyl group on the improvement of proton conductivity, the porous glass was subjected to a hydroxyl group removing treatment before it was impregnated with imidazole. The hydroxyl group removing treatment was performed as follows.

The hydroxyl group removing treatment for the porous glass was performed by treating the surface of the porous glass with a coupling agent having no acidic or basic functional group in its molecule. Vinyl trimethoxysilane ($CH_2=CH—Si—(OCH_3)_3$) in an amount of 0.2 g serving as a coupling agent was dissolved in 10 ml of toluene solvent. The porous glass was immersed in this solution, which was then allowed to react for two hours 60° C. Thereby, porous glass having the hydroxyl group removed from the surface thereof was obtained. The porous glass having the hydroxyl group removed from the surface thereof in the manner described above was subjected to back titration, and found to have almost no acidic functional group on the surface.

The back titration was performed as follows. The porous glass was immersed in 10 ml of 0.1 N aqueous sodium hydroxide solution. The solution was stirred and allowed to stand overnight, after which the porous glass was removed from the solution, and titration was performed with 0.2 N aqueous hydrochloric acid solution to measure the amount of the hydroxyl group on the surface of the porous glass.

The obtained sample 1 was subjected to X-ray diffractometry (Cu-K$\alpha$) at room temperature. No distinct diffraction peak derived from imidazole was observed at 20.9 degrees (2$\theta$). From this result, the crystallite size of the imidazole contained in the proton conducting material was found to be equal to or less than the lower limit, i.e. 10 nm, analyzable by this diffractometry.

Example 2

In Example 2, a sample 2 was obtained in the same manner as in Example 1 except that porous glass (average pore size: 4 nm, porosity: 30%, thickness: 0.5 mm) was used as a porous structural material. This porous glass was also subjected to the hydroxyl group removing treatment before use. The porous glass was also subjected to the back titration, and found to have almost no acidic functional group on the surface.

The obtained sample 2 was subjected to X-ray diffractometry at room temperature, and no distinct diffraction peak derived from imidazole was observed. Accordingly, the crystallite size of the imidazole contained in the proton conducting material was found to be equal to or less than the lower limit, i.e. 10 nm, analyzable by this diffractometry.

Example 3

In Example 3, a sample 3 was obtained in the same manner as in Example 1 except that porous glass (average pore size: 10 nm, porosity: 50%, thickness: 0.5 mm) was used as a porous structural material. This porous glass was also subjected to the hydroxyl group removing treatment before use. The porous glass was also subjected to the back titration, and found to have almost no acidic functional group on the surface.

The obtained sample 3 was subjected to X-ray diffractometry at room temperature, and no distinct diffraction peak derived from imidazole was observed. Accordingly, the crystallite size of the imidazole contained in the proton conducting material was found to be equal to or less than the lower limit, i.e. 10 nm, analyzable by this diffractometry.

Example 4

In Example 4, a sample 4 was obtained in the same manner as in Example 1 except that porous glass (average pore size: 20 nm, porosity: 50%, thickness: 0.5 mm) was used as a porous structural material. This porous glass was also subjected to the hydroxyl group removing treatment before use. The porous glass was also subjected to the back titration, and found to have almost no acidic functional group on the surface.

The obtained sample 4 was subjected to X-ray diffractometry at room temperature, and a broad diffraction peak derived from imidazole was observed. The crystallite size of the imidazole contained in the proton conducting material was found to be about 12 nm.

Example 5

In Example 5, a sample 5 was obtained in the same manner as in Example 1 except that porous glass (average pore size: 50 nm, porosity: 45%, thickness: 0.5 mm) was used as a porous structural material. This porous glass was also subjected to the hydroxyl group removing treatment before use. The porous glass was also subjected to the back titration, and found to have almost no acidic functional group on the surface.

The obtained sample 5 was subjected to X-ray diffractometry at room temperature, and a broad diffraction peak derived from imidazole was observed. The crystallite size of the imidazole contained in the proton conducting material was found to be about 40 nm.

Example 6

In Example 6, a sample 6 was obtained in the same manner as in Example 1 except that porous glass (average pore size: 100 nm, porosity: 45%, thickness: 0.5 mm) was used as a porous structural material. This porous glass was also subjected to the hydroxyl group removing treatment before use. The porous glass was also subjected to the back titration, and found to have almost no acidic functional group on the surface.

The obtained sample 6 was subjected to X-ray diffractometry at room temperature, and a sharp diffraction peak derived from imidazole was observed. The crystallite size of the imidazole contained in the proton conducting material was found to be equal to or greater than the upper limit, i.e. 100 nm, analyzable by this diffractometry.

Example 7

In Example 7, a sample 7 was obtained in the same manner as in Example 1 except that porous glass (average pore size: 200 nm, porosity: 45%, thickness: 0.5 mm) was used as a porous structural material. This porous glass was also subjected to the hydroxyl group removing treatment before use. The porous glass was also subjected to the back titration, and found to have almost no acidic functional group on the surface.

The obtained sample 7 was subjected to X-ray diffractometry at room temperature, and a sharp diffraction peak derived from imidazole was observed. The crystallite size of the imidazole contained in the proton conducting material was found to be equal to or greater than the upper limit, i.e. 100 nm analyzable by this diffractometry.

Comparative Example 1

In Comparative Example 1, only imidazole was used. Imidazole was placed in a beaker, which was then heated and melted. The molten imidazole was spread on a glass plate, which was cooled slowly to form an imidazole film on the glass plate. Thereby, a sample A was obtained.

Comparative Example 2

In Comparative Example 2, a proton conducting material in which a resin having an acidic functional group was doped with imidazole was produced. A sulfonated polyetherketone film (sulfonation rate: 72.5%) serving as a resin film having an acidic functional group was immersed, for two hours, in molten imidazole obtained by heating. The resin film was removed from the molten imidazole, which was then cooled at room temperature. The crystals of imidazole deposited on the surface were wiped off with a wiping rag dampened with ethanol. Thereby, a sample B was obtained.

Evaluation

The samples 1 to 7 and the samples A and B were analyzed for proton conductivity at different temperatures. The proton conductivity was obtained by sandwiching each sample with two gold electrodes and measuring the alternating current impedance. Because the sample A was a film formed on a glass plate, two gold wires were placed on the film of the sample A, and another glass plate was placed on the film so as to sandwich the gold wires. Then, the alternating current impedance was measured. Each sample was placed in a glass container in which a non-humidified nitrogen gas was flowing, and proton conductivity in a non-humidified environment was evaluated.

The proton conductivity was measured at 25° C., 60° C. and 120° C. for each sample. The results are shown under the columns labeled "$\kappa(25°$ C.$)$", "$\kappa(60°$ C.$)$" and "$\kappa(120°$ C.$)$" in Table 1. The proton conductivity is expressed in the unit of S/cm. Table 1 also shows the value calculated by dividing the conductivity obtained at 120° C. by that obtained at 25° C. under the column labeled "$\kappa(120°$ C.$)/\kappa(25°$ C.$)$".

TABLE 1

|  | $\kappa(120°$ C.$)$ | $\kappa(60°$ C.$)$ | $\kappa(25°$ C.$)$ | $\kappa(120°$ C.$)/\kappa(25°$ C.$)$ |
| --- | --- | --- | --- | --- |
| Sample 1 | 3.0E−03 | 6.2E−04 | 1.5E−04 | 19 |
| Sample 2 | 5.7E−03 | 1.2E−03 | 3.0E−04 | 19 |
| Sample 3 | 3.6E−03 | 7.9E−04 | 1.8E−04 | 20 |
| Sample 4 | 4.1E−03 | 8.6E−04 | 2.1E−04 | 19 |
| Sample 5 | 2.6E−03 | 5.5E−04 | 9.6E−05 | 28 |
| Sample 6 | 1.7E−03 | 2.3E−05 | 2.9E−06 | 582 |
| Sample 7 | 1.5E−03 | 1.9E−05 | 2.0E−06 | 748 |
| Sample A | 1.4E−02 | 1.9E−04 | 6.9E−06 | 1977 |
| Sample B | 2.5E−03 | 1.5E−04 | 2.0E−05 | 125 |

Although all the samples 1 to 7 and the samples A and B exhibited a high proton conductivity of above $10^{-3}$ S/cm at 120° C., different behaviors were observed in conductivity at low temperatures.

In the sample A, the proton conductivity at 25° C. relative to that at 120° C. was 1/1977, indicating that the proton conductivity decreased significantly at low temperature. In the sample B, the proton conductivity at 25° C. relative to that at 120° C. was 1/125. Although the proton conductivity improved slightly as compared to the case where only imidazole was used, the proton conductivity decreased significantly at low temperature as in the case of the sample A.

The samples 1 to 5, on the other hand, maintained a high level of proton conductivity with the proton conductivity at 25° C. relative to that at 120° C. of 1/19 to 1/28. In the samples 6 and 7, the proton conductivity decreased significantly in a low temperature range with the proton conductivity at 25° C. relative to that at 120° C. of 1/582 to 1/748.

These results indicate that the proton conducting material of the present invention comprising a porous structural material and a heterocyclic organic compound contained inside the porous structural material exhibits a high proton conductivity even at low temperatures when the crystallite size of the heterocyclic organic compound falls within 0.5 nm to 50 nm. The results also indicate that the proton conducting material of the present invention comprising a porous structural material and a heterocyclic organic compound contained inside the porous structural material exhibits a high proton conductivity even at low temperatures when the pore size of the porous structural material falls within 0.5 nm to 50 nm.

Although imidazole was used as a proton conductive heterocyclic organic compound in the examples given above, it should be understood that the present invention is not limited only to imidazole. A similar tendency was observed even when various other imidazole derivatives were used.

In Examples 8 to 10, using porous glass in the form of a film (average pore size: 4 nm, porosity: 30%, thickness: 0.5 mm) having through holes in the through hole direction as a porous structural material, proton conducting materials of the present invention were produced by introducing different amounts of acidic functional group into the surface of the pores of the porous structural material, and filling imidazole into the pores.

Example 8

In Example 8, a proton conducting material was produced in the same manner as in Example 1 except that a different pretreatment was performed before imidazole was filled into the porous glass.

After the hydroxyl group removing treatment of Example 1 was performed, a hydroxyl group recovery treatment was performed. The hydroxyl group recovery treatment was performed in the following procedure. The porous glass was placed in a beaker with 50 ml (30 wt %) of hydrogen peroxide solution and allowed to stand at 60° C. for two hours for treatment. Infrared absorption spectrum measurement confirmed, from an increase in absorption at 3560 cm$^{-1}$, that the surface of the substrate regained a hydroxyl group. The density of the acidic functional group, i.e. hydroxyl group, was determined by back titration and found to be 0.15 mmol/ml.

A sample 8 was obtained by filling imidazole into the porous glass thus obtained in the same manner as in Example 1. From a weight change before and after imidazole was filled, the density of the imidazole filled into the pores was determined to be 8.0 mmol/ml. From this result, the ratio of the acidic functional group relative to the heterocyclic organic compound introduced into the porous structural material was found to be 0.02 at a molar ratio.

Example 9

In Example 9, a proton conducting material was produced in the same manner as in Example 1 except that a different pretreatment was performed before imidazole was filled into the porous glass.

Instead of the hydroxyl group removing treatment of Example 1, a hydroxyl group addition treatment in which a hydroxyl group was added to the surface of porous glass was performed. The hydroxyl group addition treatment was performed in the following procedure. Water vapor was introduced at a flow rate of 100 ml/min, with an argon as a carrier gas, into a vacuum container (pressure: 0.10 Torr) in which the porous glass was placed. Then, a high frequency voltage (output: 100 W) was applied thereto for 10 minutes for water vapor plasma treatment. Thereby, the hydroxyl group addition treatment was performed. Infrared absorption spectrum measurement confirmed, from an increase in absorption at 3560 cm$^{-1}$, that a hydroxyl group was introduced to the surface of the substrate. The density of the acidic functional group, i.e. hydroxyl group, was determined by back titration and found to be 0.4 mmol/ml.

A sample 9 was obtained by filling imidazole into the porous glass thus obtained in the same manner as in Example 1. From a weight change before and after imidazole was filled, the density of the imidazole filled into the pores was determined to be 7.9 mmol/ml. From this result, the ratio of the acidic functional group relative to the heterocyclic organic compound introduced into the porous structural material was found to be 0.05 at a molar ratio.

Example 10

In Example 10, a proton conducting material was produced in the same manner as in Example 1 except that a different pretreatment was performed before imidazole was filled into the porous glass.

An acid was introduced to the surface of the porous glass having subjected to the hydroxyl group removing treatment of Example 1, in other words, to the surface of the porous glass having vinyl trimethoxysilane introduced to the surface thereof. For the introduction of an acid, a sulfonic acid was introduced in the following manner. The porous glass was immersed in a solution containing 3 g of sodium 2-acrylamide 2-methylpropane sulfonate, 10 ml of deionized water and 0.01 g of azoisobutylnitrile (AIBN) serving as an initiating agent for bonding at 60° C. for four hours for polymerization reaction. By this polymerization process, the organic compound having a sulfonic acid salt was covalently bonded to the surface of the substrate and immobilized. The porous glass having the organic compound with a sulfonic acid salt immobilized thereto was immersed in 1 mol/L of aqueous hydrochloric acid solution for one hour for protonation and converted into an organic sulfonic acid compound.

The density of the introduced sulfonic acid group as an acidic functional group was determined by back titration and found to be 3.8 mmol/ml.

A sample 10 was obtained by filling imidazole into the porous glass thus obtained in the same manner as in Example 1. From a weight change before and after imidazole was filled, the density of the imidazole filled into the pores was determined to be 7.7 mmol/ml. From this result, the ratio of the acidic functional group relative to the heterocyclic organic compound introduced into the porous structural material was found to be 0.5 at a molar ratio.

Example 11

In Example 11, a proton conducting material was produced in the same manner as in Example 1 except that a different pretreatment was performed before imidazole was filled into the porous glass.

An acid was introduced to the surface of the porous glass having subjected to the hydroxyl group removing treatment of Example 1, in other words, to the surface of the porous glass having vinyl trimethoxysilane introduced to the surface thereof. For the introduction of an acid, a sulfonic acid was introduced in the following manner. The porous glass immersed in 3 g of vinyl phosphate was removed therefrom and vacuum-dried, after which the porous glass was immersed in 10 ml of toluene solution containing 0.01 g of azoisobutylnitrile (AIBN) serving as an initiating agent for bonding for polymerization reaction. By this polymerization process, the organic compound having a phosphonic acid group was covalently bonded to the surface of the substrate and immobilized. The density of the introduced phosphonic acid group as an acidic functional group was determined by back titration and found to be 7.9 mmol/ml.

A sample 11 was obtained by filling imidazole into the porous glass thus obtained in the same manner as in Example 1. From a weight change before and after imidazole was filled, the density of the imidazole filled into the pores was determined to be 6.9 mmol/ml. From this result, the ratio of the acidic functional group relative to the heterocyclic organic compound introduced into the porous structural material was found to be 1.1 at a molar ratio.

Evaluation

Proton conductivity was measured for the samples 8 to 11 in the same manner as described above. The results are shown in Table 2 with the ratio (molar ratio) of the acidic functional group relative to the heterocyclic organic compound introduced into the porous structural material for each sample.

TABLE 2

| | κ(120° C.) | κ(25° C.) | κ(120° C.)/κ(25° C.) | Functional group ratio |
|---|---|---|---|---|
| Sample 2 | 5.7E−03 | 3.0E−04 | 19 | 0 |
| Sample 8 | 6.8E−03 | 3.1E−04 | 22 | 0.02 |
| Sample 9 | 1.0E−02 | 4.5E−04 | 23 | 0.05 |
| Sample 10 | 4.0E−02 | 1.7E−03 | 24 | 0.5 |
| Sample 11 | 3.2E−04 | 1.2E−05 | 25 | 1.1 |

Although the decrease in proton conductivity at low temperature was suppressed in the samples 8 to 11 as compared to the samples A and B, differences were observed in proton conductivity. In other words, except for the sample 11, a tendency was observed that the proton conductivity of the proton conducting material increased as the amount of functional group introduced was increased. This result indicates that, in order to improve conductivity, it is effective that the amount of functional group (i.e., the ratio of functional group introduced) relative to the amount of the proton conductive organic compound contained in the porous structural material is 0.01 to 0.5 at a molar ratio.

These results indicate that by introducing an acidic or basic functional group to a proton conducting material comprising a porous structural material and imidazole contained in the porous structural material, not only a high proton conductivity is maintained even at low temperatures, but also the proton conductivity can be improved in the entire temperature range. The results also indicate it is effective that the amount of functional group (i.e., the ratio of functional group introduced) relative to the amount of the proton conductive organic compound contained in the porous structural material is 0.01 to 0.5 at a molar ratio.

Although imidazole was used as a proton conductive heterocyclic organic compound in these examples, it should be understood that the present invention is not limited only to imidazole. A similar tendency was observed even when various other imidazole derivatives were used.

Example 12

In Example 12, electrodes were produced using the proton conducting materials produced in Examples 1 to 10. Using the obtained electrodes and electrolyte membranes made of the proton conducting material films produced in Examples 1 to 10, fuel cells were produced. Then, the fuel cells were evaluated for power generation characteristics. The electrolyte membranes used here had a thickness of about 0.15 mm.

The electrodes were produced in the following procedure. More specifically, the proton conducting material films produced in Examples 1 to 10 were cut by a glass cutter, each of which was pulverized using a mortar to obtain a powdered ion conducting material. The powdered ion conducting material thus obtained was mixed with a catalyst-carrying carbon and a binder at a weight ratio of 1:1:1 to prepare a catalyst paste. The catalyst-carrying carbon used here was Ketjen Black EC (trade name) (available from AKZO Chemie, the Netherlands) having an average primary particle size of 30 nm on which 50 wt % of platinum particles having an average particle size of 3 nm was carried. The binder used here was an ethylene glycol isopropanol mixed solution of NAFION (available from E.I. Du Pont de Nemours & Co. Inc., the United States).

The catalyst paste thus obtained was applied onto a surface of an electrolyte membrane by a spray coater to form a catalyst layer having a thickness of 20 µm before drying, followed by drying. Subsequently, the paste was applied, in the same manner as above, onto the other surface to form a catalyst layer having a thickness of 20 µm before drying, followed by drying. A membrane electrode assembly thus obtained was sandwiched by two sheets of carbon paper (available from Toray Industries, Inc.) having a thickness of 360 µm. Then, the membrane electrode assembly and the carbon papers were further sandwiched by a pair of carbon separators (see FIG. 5) having a fuel flow channel and an air flow channel formed thereon, respectively. Thereby, fuel cells 1 to 10 were obtained. In the membrane electrode assemblies, the power generation region had an area of 1 cm$^2$.

Comparative Example 3

As a comparative fuel cell, a fuel cell B was produced using the proton conducting material of the sample B produced in Comparative Example 2 as an electrolyte membrane. The electrolyte membrane had a thickness of about 0.18 µm.

The fuel cell was produced in the following procedure. A membrane electrode assembly was first produced by placing an anode and a cathode onto both surfaces of the electrolyte membrane such that they sandwich the electrolyte membrane. Then, a pair of carbon separators having a fuel flow channel and an air flow channel formed thereon, respectively, were disposed such that they sandwich the membrane electrode assembly. Thereby, the fuel cell B was obtained.

As the anode, a catalyst electrode having a Pt—Ru catalyst carried thereon (available from Electrochem, Inc., Pt amount: 1 mg/cm$^2$) was used. As the cathode, a catalyst electrode having a Pt catalyst carried thereon (available from Electrochem, Inc., Pt amount: 1 mg/cm$^2$) was used. In this membrane electrode assembly, the power generation region had an area of 1 cm$^2$.

Evaluation

The fuel cells 1 to 10 and the fuel cell B produced above were subjected to a power generation test. The conditions for power generation were as follows. As a fuel, a hydrogen gas was used (supply rate: 30 ml/min, gas temperature: 120° C., relative humidity of gas: 0%). As an oxidant, air was used (supply rate: 200 ml/min, gas temperature: 120° C., relative humidity of gas: 0%). The cell temperature was set to 120° C. For each fuel cell, open circuit voltage (OCV) and cell voltage (V) at a current density of 0.05 A/cm$^2$ as a cell voltage during power generation were measured. The results are shown in Table 3.

TABLE 3

| Fuel cell No. | OCV (V) | Cell voltage during power generation (V) |
|---|---|---|
| Fuel cell 1 | 0.96 | 0.42 |
| Fuel cell 2 | 0.97 | 0.60 |
| Fuel cell 3 | 0.97 | 0.46 |
| Fuel cell 4 | 0.98 | 0.55 |
| Fuel cell 5 | 0.96 | 0.45 |
| Fuel cell 6 | 0.97 | 0.27 |
| Fuel cell 7 | 0.97 | 0.18 |
| Fuel cell 8 | 0.96 | 0.60 |
| Fuel cell 9 | 0.96 | 0.65 |
| Fuel cell 10 | 0.95 | 0.70 |
| Fuel cell B | 0.93 | 0 |

As can be seen from Table 3, the comparative fuel cell B could provide no voltage at a current density of 0.05 A/cm$^2$, whereas all the fuel cells 1 to 10 could generate power. The reason why the fuel cells 1 to 10 could provide such a high output is presumably because the proton conducting materials contained in the fuel cells subjected to the above test conditions had a high proton conductivity.

Example 13

In Example 13, an electrode of the present invention was produced using a proton conducting material of the present invention containing a particulate porous structural material.

The proton conducting material was produced as follows. As an electron conductive porous structural material having pores, mesoporous carbon particles (average pore size: 5 nm, specific surface area: 1500 $m^2/g$) were used. As a proton conductive heterocyclic organic compound to be filled into the pores, imidazole was used.

The mesoporous carbon particles in an amount of 0.5 g were enclosed in a glass tube, which was then vacuum-dried at 200° C. Imidazole vapor was introduced into the glass tube until a pressure of 600 Torr was reached so as to introduce imidazole into the pores. The mesoporous carbon particles filled with imidazole were removed from the glass tube in a room temperature atmosphere. After imidazole was filled, the mesoporous carbon particles were subjected to gas adsorption measurement, and it was found that imidazole was filled in almost all 5 nm sized pores.

The obtained sample was subjected to X-ray diffractometry at room temperature. Because no distinct diffraction peak derived from imidazole was observed, the crystallite size of the imidazole contained in the proton conducting material was determined to be equal to or less than the lower limit, i.e. 10 nm, analyzable by the diffractometry.

The proton conducting material thus obtained was mixed with a catalyst-carrying carbon and a binder at a weight ratio of 1:1:0.2. The obtained catalyst paste was applied onto a polypropylene film, which was then pressed. Thereby, an electrode 1 was obtained.

As a catalyst-carrying carbon, Ketjen Black EC (trade name) (available from AKZO Chemie, the Netherlands) having an average primary particle size of 30 nm on which 50 wt % of platinum having an average particle size of 3 nm was carried was used. As a binder, polytetrafluoroethylene (available from Daikin Industries, Ltd.) was used. The amount of the catalyst carried on the obtained electrode was 3 $mg/cm^2$.

Example 14

A catalyst-carrying proton conducting material was produced as follows. As an electron conductive porous structural material having pores, mesoporous carbon particles (average pore size: 5 nm, specific surface area: 1500 $m^2/g$) were used. As a proton conductive heterocyclic organic compound to be filled into the pores, imidazole was used.

The mesoporous carbon particles in an amount of 0.5 g were enclosed in a glass tube, which was then vacuum-dried at 200° C. Thereafter, the temperature was maintained at 110° C., and toluene vapor was introduced into the glass tube until a pressure of 600 Torr was reached so as to introduce toluene into the pores.

The mesoporous carbon particles having toluene filled into the pores thereof were removed from the glass tube in a room temperature atmosphere. Then, a catalyst addition treatment was performed.

The catalyst addition treatment was performed as follows. The mesoporous carbon particles having toluene filled into the pores thereof were mixed with an aqueous solution prepared by dissolving 3 g of chloroplatinic acid ($H_2PtCl_6$) in 100 g of water. The water and toluene were dried in the air, after which reduction treatment was performed at 200° C. in a hydrogen gas so as to add a catalyst onto the mesoporous carbon particles.

Subsequently, a filling treatment of imidazole to the mesoporous carbon particles carrying a catalyst was performed. The mesoporous carbon particles carrying a catalyst in an amount of 0.5 g were enclosed in a glass tube, which was then vacuum-dried at 200° C. Imidazole vapor was introduced into the glass tube until a pressure of 600 Torr was reached so as to introduce imidazole into the pores. The mesoporous carbon particles filled with imidazole were removed from the glass tube in a room temperature atmosphere. After imidazole was filled, the mesoporous carbon particles were subjected to gas adsorption measurement, and it was found that imidazole was filled in almost all 5 nm sized pores of the mesoporous carbon particles.

The obtained sample was subjected to X-ray diffractometry at room temperature. Because no distinct diffraction peak derived from imidazole was observed, the crystallite size of the imidazole contained in the proton conducting material was determined to be equal to or less than the lower limit, i.e. 10 nm, analyzable by the diffractometry.

The catalyst-carrying proton conducting material thus obtained was mixed with a binder at a weight ratio of 1:0.2. The obtained catalyst paste was applied onto a polypropylene film, which was then pressed. Thereby, an electrode 2 was obtained. The binder used here was polytetrafluoroethylene (available from Daikin Industries, Ltd.). The amount of the catalyst carried on the obtained electrode was 3 $mg/cm^2$.

Example 15

In Example 15, a proton conducting material comprising an electron conductive particulate porous structural material having pores and an acidic functional group introduced into the surface of the pores was produced, and an electrode was produced by allowing the proton conducting material to carry a catalyst.

The catalyst-carrying proton conducting material was produced as follows. As the electron conductive porous structural material having pores, mesoporous carbon particles (average pore size: 5 nm, specific surface area: 1500 $m^2/g$) were used. As the proton conductive heterocyclic organic compound to be filled into the pores, imidazole was used.

The mesoporous carbon particles were subjected to a functional group-introducing treatment before use. The functional group-introducing treatment was performed as follows. Water vapor was introduced at a flow rate of 100 ml/min, with an argon as a carrier gas, into a vacuum container (pressure: 0.10 Torr) in which the mesoporous carbon particles were placed. Then, a high frequency voltage (output: 100 W) was applied thereto for 10 minutes for water vapor plasma treatment. Thereby, the functional group-introducing treatment was performed. The mesoporous carbon particles after the functional group-introducing treatment were subjected to infrared absorption spectrum measurement, and it was found that as the functional group, hydroxy (3560 $cm^{-1}$) and carboxyl (940 $cm^{-1}$) were introduced into the surface of the mesoporous carbon particles.

Using the mesoporous carbon particles having the functional groups introduced to the surface of the pores, a catalyst-carrying proton conducting material was produced by performing the catalyst addition treatment and the imidazole filling treatment carried out in Example 14.

The catalyst-carrying proton conducting material thus obtained was mixed with a binder at a weight ratio of 1:0.2. The obtained catalyst paste was applied onto a polypropylene film, which was then pressed. Thereby, an electrode 3 was obtained. The binder used here was polytetrafluoroethylene (available from Daikin Industries, Ltd.). The amount of the catalyst carried on the obtained electrode was 3 mg/cm$^2$.

Example 16

In Example 16, a proton conducting material of the present invention in which an acidic functional group was introduced into the surface of the pores of an electron conductive particulate porous structural material having pores using a coupling reaction. Then, an electrode was produced by allowing the proton conducting material to carry a catalyst.

The catalyst-carrying proton conducting material was produced as follows. As an electron conductive porous structural material having pores, mesoporous carbon particles (average pore size: 5 nm, specific surface area: 1500 m$^2$/g) were used. As a proton conductive heterocyclic organic compound to be filled into the pores, imidazole was used.

To the mesoporous carbon particles having subjected to the functional group-introducing treatment carried out in Example 15, a sulfonic acid group was introduced by a coupling reaction. The sulfonic acid-introducing treatment by a coupling reaction was performed as follows. The mesoporous carbon particles in an amount of 0.5 g were immersed in 10 ml of toluene solvent in which 2 g of mercaptopropyl trimethoxysilane (HS—(CH$_2$)$_3$—Si—(OMe)$_3$) was dissolved, which was allowed to react at 60° C. for two hours. Thereby, a mercapto (SH) group was immobilized on the mesoporous carbon particles, which were then immersed in 30 wt % of hydrogen peroxide aqueous solution and allowed to stand at 60° C. for two hours for treatment. Thereby, the mercapto (SH) group was converted to a sulfonic acid group (SO$_3$H), and thus mesoporous carbon particles having a sulfonic acid group immobilized on the surface thereof were produced. The mesoporous carbon particles after the functional group-introducing treatment were subjected to infrared absorption spectrum measurement, and it was found that, in the surface of the mesoporous carbon particles, the hydroxyl group (3560 cm$^{-1}$) was reduced and the sulfonic acid group (1060 cm$^{-1}$) was introduced.

Using the thus-obtained mesoporous carbon particles having a sulfonic acid group introduced to the surface thereof, a catalyst-carrying proton conducting material was produced in the same manner as in Example 14.

The catalyst-carrying proton conducting material thus obtained was mixed with a binder at a weight ratio of 1:0.2. The obtained catalyst paste was applied onto a polypropylene film, which was then pressed. Thereby, an electrode 4 was obtained. The binder used here was polytetrafluoroethylene (available from Daikin Industries, Ltd.). The amount of the catalyst carried on the obtained electrode was 3 mg/cm$^2$.

Comparative Example 4

A proton conducting material and a catalyst-carrying carbon were mixed at a weight ratio of 1:1. The obtained catalyst paste was applied onto a polypropylene film, which was then dried. Thereby, an electrode A was produced. As the proton conducting material, an ethanol solution of NAFION (trade name) (available from E.I. Du Pont de Nemours & Co. Inc., the United States) was used. As the catalyst-carrying carbon, Ketjen Black EC (trade name) (available from AKZO Chemie, the Netherlands) having an average primary particle size of 30 nm on which 50 wt % of platinum having an average particle size of 3 nm was carried was used. The amount of the catalyst carried on the obtained electrode was 3 mg/cm$^2$.

Comparative Example 5

A proton conducting material, a catalyst-carrying carbon and a binder were mixed in an ethanol solution at a weight ratio of 1:1:0.2. The obtained catalyst paste was applied onto a polypropylene film, which was then dried. Thereby, an electrode B was obtained. As the proton conducting material, imidazole was used. As the catalyst-carrying carbon, Ketjen Black EC (trade name) (available from AKZO Chemie, the Netherlands) having an average primary particle size of 30 nm on which 50 wt % of platinum having an average particle size of 3 nm was carried was used. As the binder, polytetrafluoroethylene (available from Daikin Industries, Ltd.) was used. The amount of the catalyst carried on the obtained electrode was 3 mg/cm$^2$.

Evaluation

Fuel cells were produced using the electrodes 1 to 4 and the electrodes A and B. The power generation characteristics of the obtained fuel cells were measured for evaluation of the electrodes 1 to 4 and the electrodes A and B. As an electrolyte membrane, an electrolyte membrane obtained by impregnating imidazole into the pores of a porous glass film (pore size: 4 nm, porosity: 30%, thickness: 0.15 mm) was used.

The electrolyte membrane was sandwiched between two identical electrodes formed on polypropylene films. The polypropylene films were removed therefrom to obtain a membrane electrode assembly. In the membrane electrode assembly, the power generation region had an area of 1 cm$^2$.

The membrane electrode assembly was sandwiched by two sheets of carbon paper (available from Toray Industries, Inc.) having a thickness of 360 m. Then, the membrane electrode assembly was further sandwiched by carbon separators. Thereby, a fuel cell was produced. The conditions for power generation were as follows. As a fuel, a hydrogen gas was used (supply rate: 30 ml/min, gas temperature: 120° C., relative humidity of gas: 0%). As an oxidant, air was used (supply rate: 200 ml/min, gas temperature: 120° C., relative humidity of gas: 0%). The cell temperature was set to 120° C. For each fuel cell, open circuit voltage (OCV) and cell voltage (V) at a current density of 0.05 A/cm$^2$ as a cell voltage during power generation were measured. The results are shown in Table 4.

TABLE 4

| Electrode No. | OCV (V) | Cell voltage during power generation (V) |
|---|---|---|
| Electrode 1 | 0.97 | 0.57 |
| Electrode 2 | 0.97 | 0.60 |
| Electrode 3 | 0.98 | 0.64 |
| Electrode 4 | 0.97 | 0.67 |
| Electrode A | 0.95 | 0.00 |
| Electrode B | 0.97 | 0.48 |

As can be seen from Table 4, the fuel cell including the electrode A could provide no voltage at a current density of 0.05 A/cm$^2$, whereas the fuel cells including the electrodes 1 to 4 could provide a high cell voltage during power generation. This is presumably because the proton conducting material included in the electrode A did not function under the set conditions (i.e., a cell temperature of 120° C., without humidification), whereas the proton conducting materials of the present invention included in the electrodes 1 to 4 functioned.

The fuel cells including the electrodes 1 to 4 exhibited a voltage higher than that of the fuel cell including the electrode B. This is presumably because since the electrodes 1 to 4 of the present invention contained a proton conducting material having electron conductivity and proton conductivity, the contact area between a catalyst and the proton conducting material increased, and thus the catalyst was used efficiently.

Further, because the fuel cell including the electrode 2 exhibited a higher voltage than the fuel cell including the electrode 1, it can be seen that it is effective to allow a proton conducting material particle of the present invention having electron conductivity and proton conductivity to carry a catalyst to enhance the output of the fuel cell.

Furthermore, because the fuel cells including the electrodes 3 and 4 exhibited a higher voltage than the fuel cell including the electrode 2, it can be seen that it is effective to introduce an acidic or basic functional group to a surface of an electron conductive porous structural material included in a proton conducting material of the present invention having electron conductivity and proton conductivity to enhance the output of the fuel cell.

INDUSTRIAL APPLICABILITY

As described above, because the proton conducting material of the present invention exhibits a high proton conductivity in a stable manner without humidification in a temperature range from room temperature to 200° C., an electrode produced by using the proton conducting material can use a catalyst efficiently and thus can provide a high output power.

In a fuel cell produced by using the electrode of the present invention, the provision of a humidifier and a heater can be omitted or the sizes of the humidifier and the heater can be reduced. As a result, a compact fuel cell can be achieved. Moreover, the operable temperature, which currently ranges from about 70 to 80° C., can be increased to 100° C. or greater. Accordingly, a fuel cell of higher output power can be achieved.

The proton conducting material of the present invention is applicable not only to fuel cells, but also to various devices that utilize an ion conductor, such as primary batteries, secondary batteries, condensers, sensors, capacitors, electrochromic devices and electrolytic cells, and can improve the characteristics of the devices.

The invention claimed is:

1. An electrode comprising a proton conducting material comprising:
   a porous structural material having pores; and
   a heterocyclic organic compound having proton conductivity and being selected from the group consisting of imidazole and an imidazole derivative, said organic compound being filled into said pores, wherein:
   said heterocyclic organic compound is microcrystalline or amorphous,
   said porous structural material has a pore size of not less than 0.5 nm and not greater than 50 nm, and
   said porous structural material comprises at least one of a metal oxide, glass, and ceramics.

2. The electrode in accordance with claim 1, wherein said porous structural material has a pore size of not less than 0.5 nm and not greater than 20 nm.

3. The electrode in accordance with claim 1, wherein said heterocyclic organic compound has a melting point of not less than a working temperature of said proton conducting material and not greater than 360° C.

4. The electrode in accordance with claim 1,
   wherein an acidic functional group or basic functional group is immobilized on a surface of said pores of said porous structural material by covalent bonding.

5. The electrode in accordance with claim 4,
   wherein the amount of said acidic functional group or basic functional group immobilized on a surface of said pores of said porous structural material is 0.01 to 0.5 molar ratio relative to the amount of said organic compound contained inside said porous structural material.

6. The electrode in accordance with claim 4,
   wherein said acidic functional group is at least one selected from the group consisting of a hydroxy group, a carboxyl group, a phosphonic acid group and a sulfonic acid group.

7. The electrode in accordance with claim 4,
   wherein said covalent bonding is formed by a coupling reaction.

8. The electrode in accordance with claim 1, further comprising a catalyst.

9. The electrode in accordance with claim 8, wherein said catalyst is carried on a surface of said proton conducting material.

10. A fuel cell comprising the electrode in accordance with claim 1.

11. The electrode in accordance with claim 1,
    wherein said imidazole derivative is at least one selected from the group consisting of benzimidazole, pyrazole, purine, adenine, guanine, 2-phenylimidazole, 2-methylimidazole, 2-ethylimidazole, 2-isopropylimidazole, methyl-4-imidazolecarboxylate, 4-methyl-5-imidazolecarboxyaldehyde, 4,5-dicyanoimidazole, 4-imidazolecarboxyaldehyde, 2-methylbenzimidazole, 5,6-dimethylbenzimidazole, imidazole-2-carboxyaldehyde, 4-imidazole acrylic acid, 2-aminobenzimidazole, 2-methyl-5-nitroimidazole, 2-nitroimidazole, and 4-imidazole carboxylic acid.

12. An electrode comprising:
    a porous structural material having pores; and
    a heterocyclic organic compound having proton conductivity and being selected from the group consisting of imidazole and an imidazole derivative, said organic compound being filled into said pores, wherein:
    said heterocyclic organic compound is microcrystalline or amorphous,
    said porous structural material has a pore size of not less than 0.5 nm and not greater than 50 nm, and
    said porous structural material comprises at least one of a carbon structural material and a metal.

* * * * *